US008674640B2

(12) United States Patent
Suda et al.

(10) Patent No.: US 8,674,640 B2
(45) Date of Patent: Mar. 18, 2014

(54) ELECTRIC POWER TOOL

(75) Inventors: Hidekazu Suda, Anjo (JP); Takuya Kusakawa, Anjo (JP)

(73) Assignee: Makita Corporation, Anjo-shi (JP)

( * ) Notice: Subject to any disclaimer, the term of this patent is extended or adjusted under 35 U.S.C. 154(b) by 101 days.

(21) Appl. No.: 13/334,722

(22) Filed: Dec. 22, 2011

(65) Prior Publication Data

US 2012/0169256 A1 Jul. 5, 2012

(30) Foreign Application Priority Data

Jan. 5, 2011 (JP) ................................ 2011-000687
Jan. 5, 2011 (JP) ................................ 2011-000688

(51) Int. Cl.
*H02P 1/04* (2006.01)

(52) U.S. Cl.
USPC ........... 318/430; 318/432; 388/811; 388/937; 173/4; 173/48; 173/176

(58) Field of Classification Search
USPC ......... 318/430–434; 388/811, 937; 173/4, 48, 173/176
See application file for complete search history.

(56) References Cited

U.S. PATENT DOCUMENTS 7,398,834 B2 * 7/2008 Jung et al. ......................... 173/4
7,770,658 B2 * 8/2010 Ito et al. ............................ 173/1
2004/0200628 A1 * 10/2004 Schmitzer et al. ................ 173/1
2006/0157262 A1 * 7/2006 Chen ............................. 173/176
2006/0185866 A1 * 8/2006 Jung et al. ....................... 173/48
2010/0193206 A1 8/2010 Teng

FOREIGN PATENT DOCUMENTS

| | | | |
|---|---|---|---|
| EP | 1 724 067 | A2 | 11/2006 |
| GB | 2 219 104 | A | 11/1989 |
| JP | B2-3656887 | | 6/2005 |
| JP | U-3110344 | | 6/2005 |
| JP | B2-4391921 | | 12/2009 |

OTHER PUBLICATIONS

European Search Report issued in Application No. 11195545.6; Dated Apr. 12, 2012.

* cited by examiner

*Primary Examiner* — Paul Ip
(74) *Attorney, Agent, or Firm* — Oliff PLC

(57) ABSTRACT

An electric power tool includes: a motor; a manipulation input receiving unit which receives a user manipulation input for rotating the motor; a mode changeover unit that has one manipulation portion which manipulated by the user; a rotation drive force transmitting unit that switches a transmission mechanism to one of the transmission mechanisms corresponding to the set position of the manipulation portion and transmits a drive force of the motor to a tool output shaft via the switched transmission mechanism; an electric signal output unit that outputs an electric signal corresponding to the set position of the manipulation portion; and a motor control unit that sets the control method of the motor to a control method preset for the electric signal, among a plurality of different types of control methods, based on the electric signal, and controls the motor by the set control method, based on manipulation by the user.

38 Claims, 16 Drawing Sheets

FIG. 5

| MODE CHANGEOVER LEVER | MODE CHANGEOVER 1ST SW | MODE CHANGEOVER 2ND SW | TRANSMISSION MECHANISM | MOTOR CONTROL METHOD BY CONTROLLER | USER SETTING |
|---|---|---|---|---|---|
| IMPACT MODE (ROTATION + HAMMERING) | OFF | OFF | IMPACT DRIVER MECHANISM | IMPACT CONTROL (SWITCHABLE ROTATION FREQUENCY) | MAXIMUM ROTATION FREQUENCY: 3 LEVELS (LOW SPEED/MIDDLE SPEED /HIGH SPEED) |
| DRILL MODE (ROTATION ONLY) | ON | OFF | DRILL MECHANISM | SINGLE SPEED CONTROL | ——— |
| CLUTCH MODE (ROTATION + ELECTRONIC CLUTCH) | ON | ON | DRILL MECHANISM | ELECTRONIC CLUTCH CONTROL (ELECTRONIC CLUTCH OPERATION SWITCHABLE TORQUE) | ELECTRONIC CLUTCH OPERATION TORQUE: 9 LEVELS (SET TORQUE VALUE 1-9) *MAXIMUM ROTATION FREQUENCY IS AUTOMATICALLY SWITCHED IN ACCORDANCE WITH SET TORQUE VALUE |
| VIBRATION DRILL MODE (ROTATION + HAMMERING) | OFF | ON | VIBRATION DRILL MECHANISM | SINGLE SPEED CONTROL | ——— |

ELECTRIC POWER TOOL

CROSS-REFERENCE TO RELATED APPLICATIONS

This application claims the benefit of Japanese Patent Application Nos. 2011-000687 and 2011-000688 filed on Jan. 5, 2011 in the Japan Patent Office, the disclosures of which are incorporated herein by reference.

BACKGROUND

The present invention relates to an electric power tool provided with a plurality of operation modes.

A conventionally known electric power tool has a motor as a drive source and is configured to be able to be selectively operated at one of a plurality operation modes (hereinafter, referred to as a "multimode electric power tool").

For example, Japanese Patent No. 3656887 discloses a vibration driver drill configured such that mechanical mechanisms are changed over by rotation of a dial type switching member, thereby to be able to be switched between at least two operation modes of a vibration mode and a drill mode.

Other than the above, for example, an electric power tool is known which is provided with four types of operation modes of a drill mode, a clutch mode, a vibration drill mode and an impact mode, and is configured such that the user can set one of the operation modes by sliding a mode switching lever (see, for example, Japanese Patent No. 4391921).

In the above electric power tool, the drill mode is an operation mode in which rotation of a motor is transmitted as is or with deceleration to an tool output shaft, such as a sleeve, to which a tool bit is attached. The drill mode is used, for example, in fastening of screws and boring.

At the clutch mode, rotation of a motor is also transmitted as is or with deceleration to a tool output shaft. Further, when a rotation torque of the tool output shaft (i.e., rotation torque of a tool element attached to the tool output shaft) reaches or exceeds a predetermined value, a mechanical connection between the motor and the tool output shaft is released so that the rotation of the motor is no longer transmitted to the tool output shaft, thereby to stop rotation of the tool output shaft. The clutch mode is used, for example, in fastening of screws.

At the vibration drill mode, rotation of a motor is also transmitted as is or with deceleration to a tool output shaft. Further, a rotational drive force of the motor can be used to apply intermittent hammering to the tool output shaft in its axial direction. The vibration drill mode is used, for example, in boring relatively hard materials such as cements and tiles.

At the impact mode, rotation of a motor is also transmitted as is or with deceleration to a tool output shaft. Further, a rotational drive force of the motor can be used to apply intermittent hammering to the tool output shaft in its rotation direction. The impact mode can implement operation as a so-called impact driver. The impact mode is used, for example, in fastening of screws and bolts.

As above, a multimode electric power tool that is configured to be able to implement operations at a plurality of operation modes allows various operations with just the one multimode electric power tool. There is no necessity of providing a different electric power tool per operation type. Thus, the multimode electric power tool is very convenient and beneficial for a user of an electric power tool.

However, the conventional multimode electric power tool implements switching of a plurality of operation modes just by switching of mechanical transmission mechanisms. Thus, as the number of types of operation modes is increased, the tool is likely to be increased in size and cost.

Specifically, in the conventional multimode electric power tool, a transmission mechanism for transmitting the rotation drive force of the motor to the tool output shaft is provided per a plurality of operation modes. When the user slides a mode switching lever, the transmission mechanism is also switched in conjunction with the slide manipulation.

On the other hand, the motor which generates the rotation drive force for rotating the tool output shaft is controlled by the same control method regardless of the operation mode. Particularly, it is general that the motor is controlled such that the motor is rotated at a rotation frequency (rotation frequency per unit time; rotation speed) corresponding to a pulled amount of a trigger switch manipulated by the user. When the pulled amount is the maximum, a maximum rotation frequency is achieved.

As noted above, in the conventional multimode electric power tool, the electric control method of the motor is the same regardless of the operation mode, and operation at each operation mode is achieved by switching the mechanical transmission mechanisms in accordance with the operation mode.

Thus, in order to implement an electric power tool provided with more types of operation modes, the types of transmission mechanisms has to be increased. As a whole, configuration of the mechanical mechanisms becomes complex and large. Thus, the conventional configuration in which the operation mode is switched only by switching the mechanical transmission mechanisms has been an obstacle to aiming for improved performance of a multimode electric power tool.

On the other hand, an electric power tool is also known in which control parameters of the motor can be changed by user manipulation. For example, Japanese Utility Model Registration No. 3110344 discloses an electric power tool (electric wrench) in which a user can change a set torque value.

The electric power tool described in Japanese Utility Model Registration No. 3110344 includes two buttons manipulated by a user for changing the set torque value and a display for displaying the set torque value. Thus, the user can manipulate these two buttons to change the set torque value to a desired value.

Such configuration in which the control parameter can be changed by user manipulation can be employed also in the above-described multimode electric power tool. Thereby, functionality and user-friendliness of the multimode electric power tool can be enhanced.

However, if the multimode electric power tool is configured such that the control parameter can be changed per each of the plurality of operation modes, configuration of a manipulation unit such as buttons which the user manipulates for changing the control parameters and a display unit for displaying the control parameters may become complex.

Specifically, for example, if two operation modes are configured such that a set torque value can be changed at one of the operation modes, and a maximum rotation speed of a motor can be changed at the other of the operation modes, the user has to identify the control parameter to be changed. Thus, it is general to provide a manipulation unit and a display unit per operation mode (i.e., per type of control parameter).

However, if the manipulation unit and the display unit are provided per operation mode as such, the manipulation unit and the display unit for changing and displaying the control parameter are increased in number and become complex as the types of operation modes increases at which the control parameter can be changed. A mounting area for mounting these components in the electric power tool is increased, which leads to increase in cost of the electric power tool.

SUMMARY

It is desirable that both reduction in size and cost and improvement in performance of an electric power tool can be achieved by simply configuring an electric power tool provided with a plurality of operation modes, without complicated mechanical transmission mechanisms.

It is also desirable that, in the electric power tool provided with a plurality of operation modes, a user can easily and reliably change control parameters for use at the plurality of operation modes, per operation mode, without increase in mounting area in the electric power tool and cost of the electric power tool.

An electric power tool according to a first aspect of the present invention which is provided with a plurality of operation modes includes a motor, a manipulation input receiving unit, a mode changeover unit, a rotation drive force transmitting unit, an electric signal output unit and a motor control unit. The motor drives a tool output shaft to which a tool element is attached. The manipulation input receiving unit receives a manipulation input for rotating the motor by a user.

The mode changeover unit has one manipulation portion which can be displaced by the user. By displacing the manipulation portion to one of a plurality of set positions, which are individually set per operation mode, the electric power tool is operated at an operation mode corresponding to the set position.

The rotation drive force transmitting unit transmits a rotation drive force of the motor to the tool output shaft, and includes a plurality of types of transmission mechanisms which differ in transmission methods. The rotation drive force transmitting unit is configured to switch the transmission mechanism to one of the transmission mechanisms corresponding to the set position of the manipulation portion in conjunction with the displacement manipulation of the manipulation portion. Thereby, the rotation drive force of the motor is transmitted to the tool output shaft via the switched transmission mechanism. Specifically, per set position of the manipulation portion, one of the plurality of types of transmission mechanisms is set. In conjunction with the displacement manipulation of the manipulation portion, the transmission mechanism which connects the motor and the tool output shaft is switched to the transmission mechanism corresponding to the set position, per the set position of the manipulation portion. Thus, when the manipulation portion is displaced to the set position, the rotation drive force of the motor is transmitted to the tool output shaft by the transmission mechanism corresponding to the set position, in conjunction with the displacement manipulation.

The electric signal output unit outputs an electric signal corresponding to the set position of the manipulation portion.

The motor control unit sets a control method of the motor to a control method preset for the electric signal, among a plurality of different types of control methods, based on the electric signal from the electric signal output unit. The motor control unit controls the motor by the set control method, based on manipulation of the manipulation input receiving unit by the user.

In the electric power tool configured as such, when the user displaces the manipulation portion to the set position corresponding to one of the operation modes, the transmission mechanism is switched to the transmission mechanism corresponding to the set position among the plurality of types of transmission mechanisms, in the rotation drive force transmitting unit. Also, the electric signal output unit outputs the electric signal corresponding to the set position. Thus, the control method of the motor by the motor control unit is set in the control method preset for the electric signal. By combination of the switched transmission mechanism and the set control method, operation at the operation mode corresponding to the set position is implemented.

As above, the electric power tool of the present invention includes the transmission mechanisms and control methods required to implement desired operation modes, and combines the transmission mechanisms and control methods. Thereby, a mechanical transmission mechanism can be omitted or simplified, in comparison to a conventional electric power tool which achieves switching of the operation modes only by switching of the mechanical transmission mechanisms. Further, various operation modes equivalent to or more of those as before can be implemented. Accordingly, both reduction in size and cost and improvement in performance of the electric power tool can be achieved.

There is no necessity to provide different transmission mechanisms per the set position of the manipulation portion (i.e., per the operation mode). For example, the same transmission mechanism may be used at the certain operation modes.

The "plurality of types of transmission mechanisms" do not mean that a plurality of different transmission mechanisms are individually and solely present per operation mode. For example, the transmission mechanisms may include a component shared among the plurality of operation modes. Specifically, as long as the plurality of different transmission methods can be consequently achieved, particular configuration and composition of each of the transmission mechanisms can vary. For example, each of the transmission mechanisms may be configured individually and solely, or part of components may be shared among the plurality of transmission mechanisms, and so on.

The same applies to the electric signal. There is no necessity to output different electric signals per the set position of the manipulation portion (i.e., per the operation mode). For example, the same electric signal may be outputted at the certain operation modes.

Specifically, the same transmission mechanisms may be used at the different operation modes, and the same control methods may be used at the different operation modes, as long as desired operation modes can be achieved by combining the transmission mechanisms and the control methods. Especially, for example, the number of types of transmission mechanisms in regard to the types of operation modes may be reduced as much as possible, such as by sharing the same transmission mechanism with more number of operation modes or providing a plurality of transmission mechanisms shared among a plurality of operation modes. In this way, operation as a different operation mode may be implemented by electrical switching of control methods. Then, further reduction in size and cost can be achieved while performance is improved.

What particular method to provide as the control method can be variously considered. For example, it is preferable that the control method at least includes a basic control in which the motor is rotated at a rotation speed corresponding to a manipulation variable of the manipulation input receiving unit by the user within a range up to a preset maximum rotation frequency, and at least one applied control which differ from the basic control.

Since the electric power tool of the present invention includes at least the basic control and the applied control as above, the basic control is used at the operation mode in which a simple control, such as motor rotation at the rotation speed corresponding to the manipulation variable of the manipulation input receiving unit, is appropriate, while the applied control is used which corresponds to the operation mode in which control by the control method which differ from the basic control is appropriate. Thus, the motor can be controlled by the control method in accordance with the operation mode.

There are various particular examples for the applied control. For example, it is preferable that the electric power tool further includes a torque detector that directly or indirectly detects a rotation torque of the tool output shaft. As the applied control, at least an electronic clutch control is provided which is based on the control method by the basic control and stops rotation of the motor when the rotation torque detected by the torque detector reaches or exceeds a predetermined set torque value.

As above, since the electric power tool of the present invention includes the electronic clutch control as the control method, a clutch mechanism (a function that makes the motor run idle when the rotation torque of the tool output shaft has reached a set parameter so that the rotation drive force is not transmitted to the tool output shaft) which has been conventionally implemented by a mechanical mechanism can be implemented by electric control. Thus, the mechanical clutch mechanism is no longer required. Reduction in size and weight of the electric power tool can be achieved.

In case that the electronic clutch control is provided as the control method, the set torque value may be configured to be changed by the user. Specifically, the electric power tool further includes a torque value setting changing unit that can change the set torque value to one of a plurality of values by user operation. When the control method is set in the electronic clutch control, the motor control unit performs the electronic clutch control based on the torque value set by the torque value setting changing unit. Specifically, if the rotation torque reaches or exceeds the torque value set by the torque value setting changing unit, rotation of the motor is stopped.

As above, since the electric power tool of the present invention includes the torque value setting changing unit, the set torque value can be arbitrarily changed by the user. The tool element can be operated within a desired range of rotation torque. Moreover, the change of the set torque value is not implemented by switching of mechanical mechanisms but by electric control of the motor by the motor control unit. Thus, change of the set torque value can be achieved by a simpler configuration than before.

In case that the set torque value can be changed by the user, it is preferable that the maximum rotation speed is also set per set torque value. Specifically, a maximum rotation frequency is set per a plurality of the set torque values which can be changed by the torque value setting changing unit. When the control method is set in the electronic clutch control, the motor control unit performs the electronic clutch control based on the torque value set by the torque value setting changing unit and the maximum rotation speed set in accordance with the set torque value. Specifically, the motor control unit rotates the motor within a range up to the set maximum rotation speed, and, if the rotation torque reaches or exceeds the set torque value, stops rotation of the motor.

As above, if the maximum rotation speed is set per the set torque value, the maximum rotation speed as well can be set to an appropriate value in accordance with the set torque value. From a viewpoint of the user, if the set torque value is set to a desired value, the maximum rotation speed is also set to an appropriate value in accordance with the set torque value automatically. Thus, a higher value-added electronic clutch control than before can be achieved.

Particular setting methods of the maximum rotation speed per the set torque value can be variously considered. For example, the different maximum rotation speeds may be set per the set torque value, or the same maximum rotation speed may be set for the plurality of set torque values.

The plurality of set torque values can be set in a stepwise fashion. In that case, the electric power tool can be provided which includes a convenient electronic clutch control function, if a set torque interval which is an interval between each set torque value is appropriately determined.

Further, only one type of the electronic clutch control may be provided in which a plurality of set torque values are set in a stepwise fashion as above, or a plurality of such types of electronic clutch controls may be provided. Particularly, the plurality of set torque values are set to increase in a stepwise fashion by a predetermined set torque interval, from a minimum value to a maximum value. As the applied control, at least two types of electronic clutch controls are set which differ in at least the set torque interval.

With the plurality of types of electronic clutch controls, a plurality of operation modes at which electronic clutch control is used can be set per the type of electronic clutch control. A high-performance electric power tool can be provided which includes a more convenient electronic clutch control function than before.

Also, the electric power tool of the present invention including the electronic clutch control may be configured as below. The electric power tool may include at least a basic transmission mechanism, as the transmission mechanism, which transmits rotation of the motor to the tool output shaft as is or with deceleration. As the operation mode, at least a clutch mode is provided at which, when the tool output shaft is rotated and the rotation torque of the tool output shaft reaches or exceeds the set torque value, rotation of the motor is stopped. When the manipulation portion is displaced by the user to a set position corresponding to the clutch mode, the rotation drive force transmitting unit is configured to switch the transmission mechanism to the basic transmission mechanism among the plurality of types of transmission mechanisms, the electric signal output unit outputs the electric signal corresponding to the set position, and the motor control unit sets the control method in the electronic clutch control based on the electric signal. Thereby, operation of the tool output shaft in the clutch mode is implemented.

In the electric power tool configured as above, by combining the basic transmission mechanism as the transmission mechanism and the electronic clutch control as the control method, the clutch mode as one of the operation modes in the electric power tool is implemented. Thus, although the transmission mechanism is a simple basic transmission mechanism, the same function as the clutch mode which uses a conventional mechanical clutch mechanism can be implemented since the motor control unit performs electronic clutch control.

As for the basic control as one of the motor control methods, one type of the basic control may be provided, or a plurality of types of the basic controls which differ in the maximum rotation speed may be provided. In either case, it is preferable that the electric power tool of the present invention further includes a maximum rotation speed setting changing unit that is used for at least one type of the basic controls and that can change the maximum rotation speed to one of a plurality of different values by user operation. The motor control unit, when the control method is set in the basic control in which the maximum rotation speed setting changing unit is used, performs the basic control based on the maximum rotation speed set by the maximum rotation speed setting changing unit (i.e., rotates the motor at the rotation speed corresponding to the manipulated variable of the manipulation input receiving unit within a range up to the maximum rotation speed).

According to the electric power tool configured as above, variations of the maximum rotation speeds which have been conventionally implemented by mechanical mechanisms can be implemented by electric control. Specifically, setting of an appropriate maximum rotation speed in accordance with a purpose of use of the electric power tool can be implemented not by mechanically but electrically (i.e., by control of the motor control unit). The electric power tool provided with a convenient basic control function can be simply configured.

Also, a plurality of the maximum rotation speeds can be set in a stepwise fashion. In that case, a speed width which is an interval between each of the maximum rotation speeds can be arbitrarily determined. Thereby, an electric power tool including a more convenient basic control function than before can be provided.

Further, only one type of the basic control may be provided in which a plurality of the maximum rotation speeds are set in a stepwise fashion as above, or a plurality of such types of the basic controls may be provided. Particularly, the plurality of maximum rotation speeds are set to increase in a stepwise fashion by a predetermined speed width, from a minimum value to a maximum value. As the basic control in which the maximum rotation speed setting changing unit is used, at least two types of basic controls are set which differ at least in the speed width.

With the plurality of types of basic controls, the user can select a desired basic control out of the plurality of types of basic controls in accordance with the purpose of use. The electric power tool can be provided which includes a more convenient basic control function than before.

Also, the electric power tool of the present invention including the basic control may be configured as below. The electric power tool may include at least a first rotation hammering mechanism, as the transmission mechanism, which transmits rotation of the motor to the tool output shaft as is or with deceleration and can use the rotation drive force of the motor to apply intermittent hammering to the tool output shaft in its rotation direction. At least an impact mode, as the operation mode, is provided at which the rotation drive force of the motor is transmitted to the tool output shaft via the first rotation hammering mechanism. When the manipulation portion is displaced to the set position corresponding to the impact mode, the rotation drive force transmitting unit is configured to switch the transmission mechanism to the first rotation hammering mechanism among the plurality of types of transmission mechanisms, the electric signal output unit outputs the electric signal corresponding to the set position, and the motor control unit sets the control method in the basic control based on the electric signal. Thereby, operation of the tool output shaft as the impact mode is implemented.

In the electric power tool configured as above, by combining the first rotation hammering mechanism as the transmission mechanism and the basic control as the control method, the impact mode as one of the operation modes in the electric power tool is implemented.

Especially if the maximum rotation speed can be changed by user operation, change of the maximum rotation speed is implemented not by a mechanical mechanism but by electric control. Thus, the impact mode including a changing function of the maximum rotation speed can be more easily implemented than before.

What particular mechanism to provide as the transmission mechanism can be arbitrarily determined. For example, it is preferable that the electric power tool includes at least one of a basic transmission mechanism which transmits rotation of the motor to the tool output shaft as is or with deceleration, a first rotation hammering mechanism which transmits rotation of the motor to the tool output shaft as is or with deceleration and can use the rotation drive force of the motor to apply intermittent hammering to the tool output shaft in its rotation direction, and a second rotation hammering mechanism which transmits rotation of the motor to the tool output shaft as is or with deceleration and can use the rotation drive force of the motor to apply intermittent hammering to the tool output shaft in its axial direction.

As above, with inclusion of at least one of the basic transmission mechanism, the first rotation hammering mechanism and the second rotation hammering mechanism, the electric power tool can be provided which is variously configured in accordance with use by the user.

Also, there are various considerations on what particular electric signal is outputted by the electric signal output unit which outputs the electric signal corresponding to the set position of the manipulation portion. For example, an analog signal of a value corresponding to the set position of the manipulation portion may be outputted. Or, a digital signal corresponding to the set position of the manipulation portion may be outputted.

Especially if the electric signal output unit is configured to output a digital signal, it is preferable that the electric signal output unit includes at least one switching portion that outputs a binary signal indicating either one of an ON or OFF state. It is further preferable that, when the manipulation portion is displaced to one of the setting positions, the ON or OFF state of the at least one switching portion is switched to a state corresponding to the set position.

According to the electric power tool configured as such, a digital signal corresponding to the ON or OFF state of the (at least one) switching portion constituting the electric signal output unit is outputted as the electric signal. The motor control unit can determine by which control method to control the motor based on the electric signal (digital signal).

How many switching portions to provide can be arbitrarily determined as well. For example, the same number as the number of control methods or of operation modes may be provided, and which control method to use may be determined in accordance with which switching portion is turned ON (or OFF).

However, since one switching portion can output a binary signal, for example, one switching portion can be sufficient in the case of two operation modes, and two switching portions can be sufficient for four operation modes, if the number of switching portions should be reduced as much as possible. Thus, less number of switching portions may be set than the number of operation modes of the electric power tool. By combination of the ON or OFF state of each switching portion, a digital signal may be outputted which differs per the set position of the manipulation portion. In this manner, desired digital signals can be outputted by the minimal number of switching portions. Further reduction in size of the electric power tool can be achieved.

In case that the same control method is shared among the plurality of operation modes, a digital signal to be outputted may be the same since the control method is the same. Therefore, in that case, the number of switching portions can be further reduced.

There are various particular configurations for the switching portion that outputs a binary signal indicating either the ON or OFF state. For example, the switching portion may be configured by a contact switch in which contact points contact in one of the ON and OFF states and the contact points are separated in the other of the states. In case that the switching portion is configured by the contact switch and that at least one hammering mechanism is provided as the transmission mechanism which uses the rotation drive force of the motor to apply intermittent hammering to the tool output shaft in its rotation direction or axial direction, it is preferable that contact points of at least one of the switching portions are separated when the transmission mechanism is switched to the hammering mechanism.

At the operation mode in which hammering is applied to the tool output shaft, vibration is transmitted to the electric power tool upon application of hammering. Thus, if the contact points of the contact switch as the switch unit are in contact at such operation mode, wear of the contact points advances due to vibration upon application of hammering.

If at least one of the contact points of the switch unit is separated at the operation mode in which hammering is applied, i.e., when the transmission mechanism is switched to at least one of hammering mechanisms, wear of the contact points can be inhibited. Reliability of the electric power tool is enhanced.

If the transmission mechanism is switched to the first rotation hammering mechanism when provided as the transmission mechanism which transmits rotation of the motor to the tool output shaft as is or with deceleration and can use the rotation drive force of the motor to apply intermittent hammering to the tool output shaft in its rotation direction, it is preferable that the contact points of all the switch units are separated.

According to the electric power tool configured as above, the contact points of all the switching portions are separated under a condition that the rotation drive force of the motor is transmitted to the tool output shaft by the first rotation hammering mechanism in which hammering is applied in the rotation direction of the tool output shaft. Thus, progression of wear of the contact points of the switching portions by the hammering can be reliably inhibited.

An electric power tool may be provided with four types of operation modes. The four types of operation modes are a drill mode, a clutch mode, an impact mode and a vibration drill mode. At the drill mode, a tool output shaft to which a tool element is attached is rotated. At the clutch mode, the tool output shaft is rotated and rotation of the tool output shaft is stopped when a rotation torque of the tool output shaft reaches or exceeds a predetermined set torque value. At the impact mode, the tool output shaft is rotated and intermittent hammering can be applied to the tool output shaft in its rotation direction. At the vibration drill mode, the tool output shaft is rotated and intermittent hammering can be applied to the tool output shaft in its axial direction.

The electric power tool also includes a motor as a drive force for rotation of the tool output shaft and hammering, a mode changeover unit for setting the operation mode to one of the four types of operation modes, a torque detection unit that directly or indirectly detects the rotation torque of the tool output shaft, and a motor control unit that controls the motor.

A function of stopping rotation of the tool output shaft in case that the rotation torque of the tool output shaft reaches or exceeds the set torque value at the clutch mode is implemented by the motor control unit which stops rotation of the motor in case the rotation torque detected by the torque detection unit reaches or exceeds the set torque value.

According to the electric power tool configured as above, stopping of rotation of the tool output shaft in accordance with the rotation torque can be implemented not by a conventional mechanical mechanism but by electric control of the motor in which rotation of the motor is stopped when the rotation torque reaches or exceeds the set torque value, at least at the clutch mode. Thus, such mechanical mechanism can be omitted or simplified. Both reduction in size and cost and improvement in performance can be achieved.

The electric power tool may have features as follows.

The electric power tool may be provided with a plurality of operation modes, and include a motor, an operation mode setting unit and a motor control unit. The motor generates a rotation drive force for driving a tool element. The operation mode setting unit is operated by a user to set the operation mode of the electric power tool to one of the plurality of operation modes. The motor control unit controls the motor by a control method corresponding to the operation mode set by the operation mode setting unit. At least two of the plurality of operation modes may be specified operation modes at which the motor control unit uses a predetermined control parameter corresponding to the operation mode to control the motor, and the control parameter can be changed to one of a plurality of different values by user operation.

The electric power tool may further include a setting change manipulation unit and a parameter control unit. The setting change manipulation unit is manipulated by a user to change the control parameter which is shared among the specified operation modes and corresponds to the specified operation modes. The parameter control unit, when the operation mode of the electric power tool is set at one of the specified operation modes, accepts change by the setting change manipulation unit to the control parameter corresponding to the specified operation mode.

In the electric power too configured as such, at each of the plurality of specified operation modes, the control parameter used at the specified operation mode can be changed by the user. The user can change the control value corresponding to the currently set specified operation mode by manipulating the same and common setting change manipulation unit, regardless of the type of the control parameter to be changed (i.e., regardless of the control parameter at which specified operation mode).

Accordingly, while increase in mounting area of the setting change manipulation unit in the electric power tool is inhibited and cost of the electric power tool is suppressed, the control parameter used at each of the plurality of specified operation modes can be easily and reliably changed by the user per the operation mode.

The above configured electric power tool can further includes a unit that displays the control parameter set by the user. In that case, it is preferable that the display unit is also configured to be shared at the plurality of specified operation modes, as in the case of the setting change manipulation unit.

Specifically, the electric power tool may include a display unit that is shared at the specified operation modes and displays parameter information indicating the control parameter corresponding to each of the specified operation modes. The parameter control unit, when the operation mode of the electric power tool is set to one of the specified operation modes, accepts the change by the setting change manipulation unit of the control parameter corresponding to the specified operation mode and displays the parameter information indicating the currently set control parameter on the display unit.

According to the electric power tool configured as above, both the setting change manipulation unit for changing the control parameter and the display unit are shared at the plurality of specified operation modes. Thus, increase in mounting area of these components in the electric power tool and cost of the electric power tool can be suppressed. At the same time, the control parameter can be easily and reliably changed by the user per operation mode.

In case that the display unit shared at a plurality of specified operation modes is provided as such, it is preferable that the parameter control unit displays the parameter information on the display unit by a display method which differ per type of specified operation mode.

In this manner, the user upon viewing a content of display on the display unit can easily understand which operation mode is currently set and which value the control parameter at which operation mode is set.

There are various different display methods per type of specified operation mode. For example, at least one of the display methods may be an indication by numerals, or an indication other than by numerals. Of course, numerals and the other indication may be used in combination. The other indication can be, for example, by alphabets, horizontal bars, or vertical bars.

As above, displaying the control parameter by various methods per the type of operation mode allows sharing the same display unit as well as easy and reliable identification of each of the control parameters.

The particular display unit can be variously configured. For example, the display unit can include a display device composed by at least a plurality of segments.

Further, as the display device composed by a plurality of segments, there are various types which are different in number of segments. For example, use of a seven-segment LED allows further reduction in cost.

The particular setting change manipulation unit can be variously configured. For example, the setting change manipulation unit can be configured to at least include an increase manipulation portion that is depressed for increasing the control parameter, and a decrease manipulation portion that is depressed for decreasing the control parameter.

According to the electric power tool configured as above, appropriate manipulation of the two manipulation portions allows easy and reliable increase and decrease of the control parameter corresponding to the currently set operation mode, regardless of the type of specified operation mode.

If the setting change manipulation unit is provided with the two manipulation portions as noted above, it is preferable that the parameter control unit accepts the setting change manipulation as below. Specifically, the parameter control unit increases the control parameter by one level each time the increase manipulation portion is depressed, and increases the control parameter in a stepwise fashion at a predetermined interval as long as the increase manipulation portion is kept depressed for more than a predetermined period. Also, the parameter control unit decreases the control parameter by one level each time the decrease manipulation portion is depressed, and decreases the control parameter in a stepwise fashion at a predetermined interval as long as the decrease manipulation portion is kept depressed for more than a predetermined period.

As above, if the user keeps depressing i.e., presses and holds, each the manipulation portion for more than a predetermined period, the control parameter sequentially increases (or decreases) automatically while the press and hold continues. As a result, improvement in convenience of the user can be achieved.

BRIEF DESCRIPTION OF THE DRAWINGS

The present invention will now be described by way of examples with reference to the accompanying drawings, in which:

FIG. 5 is an explanatory view for describing an operation state of the electric power tool in each of four operation modes;

DETAILED DESCRIPTION OF THE PREFERRED EMBODIMENTS

A preferred embodiment of the present invention will be described below by way of the accompanying drawings.

Figure 1:
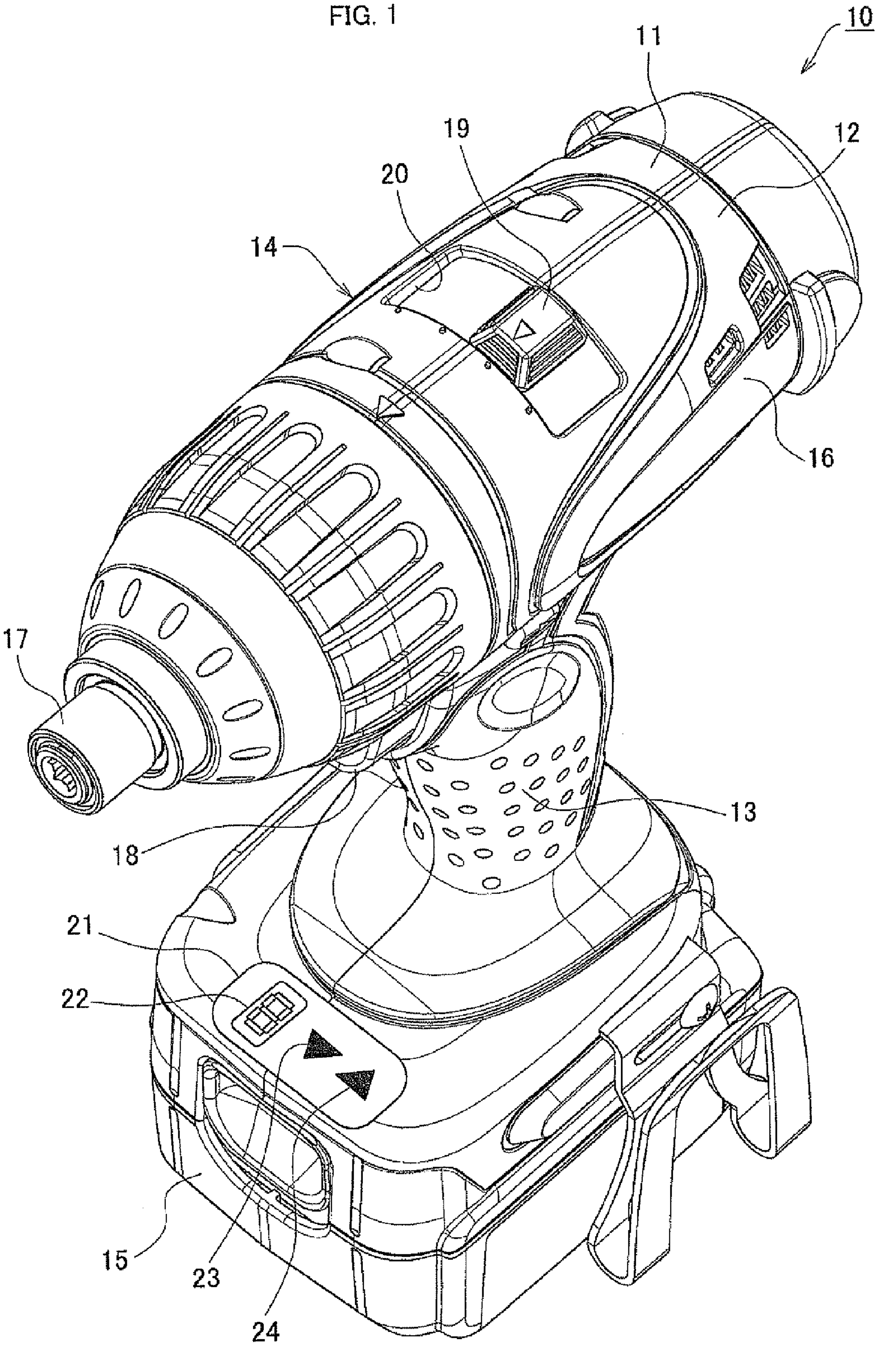
FIG. 1 is a perspective view showing an outer appearance of an electric power tool according to an embodiment.

As shown in FIG. 1, an electric power tool 10 of the present embodiment is configured as a rechargeable four-mode impact driver which can operate at four types of operation modes.

More particularly, the electric power tool 10 includes a main body housing 14 and a battery pack 15. The main body housing 14 is formed by assembling half housings 11 and 12.

A handle 13 extends below the main body housing 14. The battery pack 15 is detachably attached to a lower end of the handle 13.

In a rear portion of the main body housing 14, a motor housing 16 is provided which houses a motor 30 (see FIGS. 2A-2C, 4 and others). The motor 30 is a power source of the electric power tool 10. Forward than the motor housing 16, a drive force transmission unit 45 (see FIGS. 2A-2C) is housed which includes a plurality of types of transmission mechanisms.

A sleeve 17 protrudes at a front end of the main body housing 14. The sleeve 17 can attach and detach a not shown tool bit (e.g., driver bit), which is one example of a tool element, to and from a front end of each of the transmission mechanisms.

On an upper end side of the handle 13 in the main body housing 14, a trigger switch 18 is provided. The trigger switch 18 can be manipulated while a user (manipulator) of the electric power tool 10 grasps the handle 13, in order to rotate and drive the motor 30 to operate the electric power tool 10.

Further, on a top surface of the main body housing 14, a mode changeover lever 19 is provided. The mode changeover lever 19 is slid (displaced) by the user so that the electric power tool 10 is set at one of the operation modes.

The mode changeover lever 19 can be slid in a right and left direction inside a slide frame 20 formed on the top surface of the main body housing 14. Also, in the right and left direction, four positions are set in advance to respectively correspond to the four operation modes of the electric power tool 10 of the present embodiment. When the user sets (slides) the mode changeover lever 19 to one of the positions, the operation mode corresponding to the position can be set.

In the present embodiment, the four operation modes are an impact mode (rotation+hammering in a rotation direction), a drill mode (only rotation), a clutch mode (rotation+electronic clutch), and a vibration drill mode (rotation+hammering in an axial direction).

As shown in FIG. 1, forward of the slide frame 20 on the top surface of the main body housing 14, a letter string (not shown in FIG. 1) indicating one of the operation modes and a circle sign are formed at a position corresponding to the operation mode. Particularly, as shown in FIGS. 2A-2C and FIGS. 3A-3D, starting from the left, a letter string of "impact" and a circle sign indicating a set position corresponding to the impact mode, a letter string of "drill" and a circle sign indicating a set position corresponding to the drill mode, a letter string of "clutch" and a circle sign indicating a set position corresponding to the clutch mode, and a letter string of "vibration" and a circle sign indicating a set position corresponding to the vibration drill mode, are formed.

When the user slides the mode changeover lever 19 to adjust (set) a front end of a triangular arrow formed on a top surface of the mode changeover lever 19 to the circle sign at one of the four set positions, the electric power tool 10 can be operated at the operation mode corresponding to the set position.

Also, at a lower end side of the handle 13, a manipulation/display panel 21 is provided to change and display control parameters at a predetermined operation mode. The manipulation/display panel 21 includes two setting changeover switches 23 and 24 (setting switching down switch 23 and setting switch up switch 24), and a display LED 22. The two setting changeover switches 23 and 24 are manipulated by the user to change the control parameters. The display LED 22 displays the control parameters changed by the two setting changeover switches 23 and 24 (i.e., current control parameters).

The electric power tool 10 of the present embodiment is configured such that the user can change a predetermined parameter at the clutch mode and the impact mode, respectively, out of the four operation modes. Particularly, at the clutch mode, a set torque value can be set to nine levels. At the impact mode, a maximum rotation frequency (maximum rotation speed) of the motor 30 can be set to three levels. Details of these parameters will be described later. In the present embodiment, the term "rotation frequency" means a rotation frequency per unit time, i.e., rotation speed.

Now, an outline of the transmission mechanisms for transmitting a rotation drive force of the motor 30 to the sleeve 17 (and to the tool bit) will be described by way of FIGS. 2A-2C.

Figure 2A:
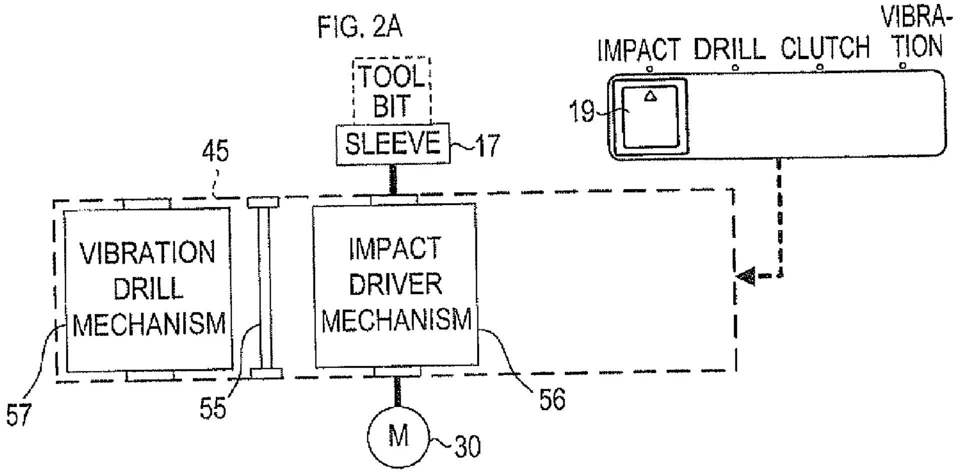
FIGS. 2A, 2B and 2C are explanatory views showing that a transmission mechanism is switched in conjunction with a mode changeover lever in the electric power tool.
Figure 2B:
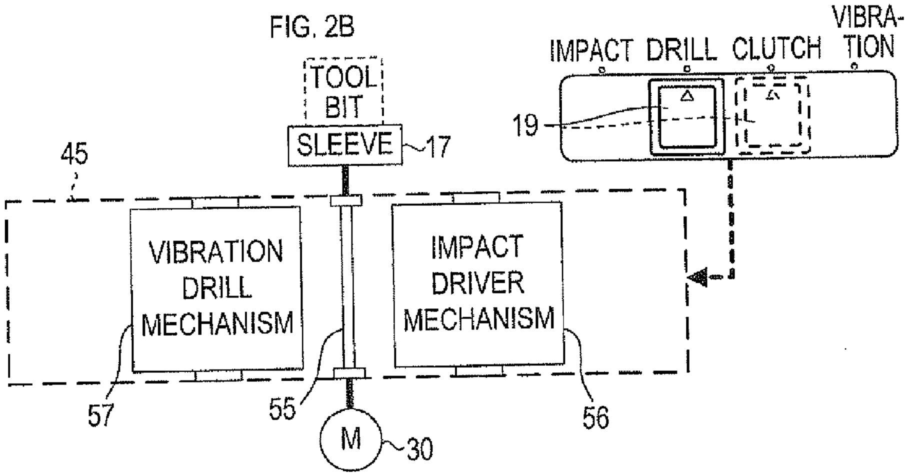
Figure 2C:
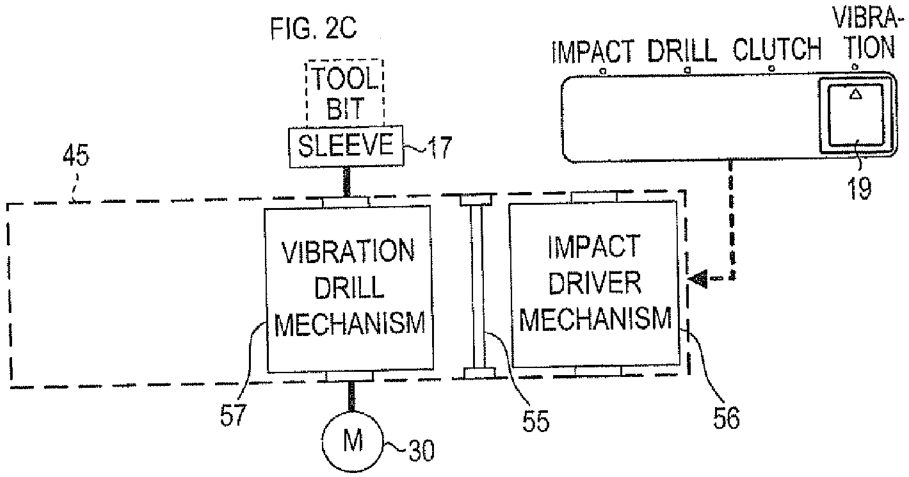

As shown in FIGS. 2A-2C, the drive force transmission unit 45 including the three types of transmission mechanisms different in transmission methods is provided inside the electric power tool 10. When the user slides and sets the mode changeover lever to one of the four set positions, the mechanical transmission mechanism for transmitting the rotation drive force of the motor 30 to the sleeve 17 is also switched to the transmission mechanism corresponding to the set position among the three types of transmission mechanisms, in conjunction with the slide manipulation.

In the present embodiment, a drill mechanism 55, an impact driver mechanism 56, and a vibration drill mechanism 57 are provided as the mechanical transmission mechanism. The drill mechanism 55 decelerates and transmits rotation of the motor 30 to the sleeve 17. The impact driver mechanism 56 decelerates and transmits rotation of the motor 30 to the sleeve 17, and also applies intermittent hammering in the rotation direction to the sleeve 17 based on the rotation driving force of the motor 30. The vibration drill mechanism 57 decelerates and transmits rotation of the motor 30 to the sleeve 17, and applies intermittent hammering in the axial direction (direction orthogonal to a plane of rotation of the motor 30) to the sleeve 17 based on the rotation driving force of the motor 30. If it is intended to rotate the tool bit at the same rotation frequency as the rotation frequency of the motor 30, the transmission mechanisms may be configured such that rotation of the motor 30 can be transmitted directly to the tool bit, without deceleration of rotation of the motor 30.

In the above configuration, when the user slides and sets the mode changeover lever 19 to the "impact" set position in order to set the operation mode to the impact mode, the transmission mechanism which transmits the rotation drive force of the motor 30 to sleeve 17 in the drive force transmission unit 45 is switched in conjunction with the slide manipulation. As shown in FIG. 2A, the transmission mechanism is switched to the impact driver mechanism 56.

The impact driver mechanism 56 includes, for example, a spindle, a hammer, and an anvil. The spindle is rotated via a deceleration mechanism. The hammer rotates with the spindle and can move in an axial direction. The anvil is disposed ahead of the hammer. A tool bit is attached to the front end of the anvil.

More particularly, the impact driver mechanism 56 is configured as follows. In the impact driver mechanism 56, when the spindle is rotated along with the rotation of the motor 30, the anvil rotates via the hammer to rotate the sleeve 17 (and rotate the tool bit). Thereafter, as thread fastening by the tool bit proceeds and a load onto the anvil is increased, the hammer recedes against a biasing force of a coil spring and comes free from the anvil. Then, the hammer advances by the biasing force of the coil spring, while rotating together with the spindle, to be caught by the anvil again. As a result, intermittent hammering is applied to the anvil, and tightening, etc. can be done. The impact driver mechanism 56 as such is disclosed, for example, in the above-mentioned Japanese Patent No. 4391921 and Unexamined Japanese Patent Application Publication No. 2006218605, the disclosures of which are incorporated herein by reference.

When the user slides and sets the mode changeover lever 19 to the "drill" or "clutch" set position in order to set the operation mode to the drill mode or the clutch mode, the transmission mechanism which transmits the rotation drive force of the motor 30 to the sleeve 17 in the drive force transmission unit 45 is also switched in conjunction with the slide manipulation. As shown in FIG. 2B, the transmission mechanism is switched to the drill mechanism 55, in either case of the drill mode or the clutch mode. The drill mechanism 55 is a mechanism which transmits the rotation of the motor 30 as is or with deceleration to the sleeve 17. Since the particular configuration the mechanism is known, the description herein is not given in detail.

When the user slides and sets the mode changeover lever 19 to the "vibration" set position in order to set the operation mode to the vibration drill mode, the transmission mechanism which transmits the rotation drive force of the motor 30 to the sleeve 17 in the drive force transmission unit 45 is also switched in conjunction with the slide manipulation. As shown in FIG. 2C, the transmission mechanism is switched to the vibration drill mechanism 57.

The vibration drill mechanism 57 is particularly configured as follows. A spindle which is rotated by the rotation drive force of the motor 30 is provided in a manner to be able to slightly move in its axial direction. The spindle is also biased to the front end side in the axial direction by a biasing unit such as a coil spring provided around the spindle. A first clutch which rotates together with the spindle is fixedly installed on the spindle. Inside the main body housing 14, a second clutch is fixedly installed to face the first clutch and to be movable with respect to the spindle. As a result of engagement of the both clutches, axial hammering (vibration) operation is applied to the spindle. The particular configuration of the vibration drill mechanism as such is disclosed, for example, in the above mentioned Japanese Patent No. 4391921 and Unexamined Japanese Patent Application Publication No. 2002-263930, the disclosures of which are incorporated herein by reference.

The explanatory views of the transmission mechanisms shown in FIGS. 2A to 2C are conceptual diagrams for explaining in an easy-to-understand manner on an image/conceptual basis that the transmission mechanism is switched by the slide manipulation of the mode changeover lever 19. In practice, the mechanisms 55, 56 and 57 do not exist individually and independently.

In practice, as described in Japanese Patent No. 4391921, the mechanisms 55, 56 and 57 are serially arranged in the order of the drill mechanism 55, the impact driver mechanism 56 and the vibration drill mechanism 57, from the rear end to the front end of the electric power tool 10 (i.e., from the motor 30 to the sleeve 17), in general. Also, each of the mechanisms 55, 56 and 57 includes a component shared by any two or all of the mechanisms. As a result that various mechanical links are switched by the slide manipulation of the mode changeover lever 19, the rotation drive force of the motor 30 is transmitted to the sleeve 17 via a transmitting path corresponding to the set position of the mode changeover lever 19.

Of course, each of the mechanisms 55, 56 and 57 may be provided individually and independently, and may be configured to be switched to one of the mechanisms by the slide manipulation of the mode changeover lever 19.

The mode changeover lever 19, in more detail, is formed to be fixed on a slide member 50, as shown in FIGS. 3A to 3D. Thus, when the mode changeover lever 19 is slid, the slide member 50 also moves in the right and left direction integrally with the mode changeover lever 19.

Further, on the underside of the slide member 50 (inner side of the electric power tool 10), two projections 51 and 52 (a first projection 51 and a second projection 52) are provided. The two projections 51 and 52 are spaced by a predetermined distance in a slide direction (right and left direction) of the mode changeover lever 19. Thus, when the mode changeover lever 19 is slid, the projections 51 and 52 also move in the right and left direction integrally with the mode changeover lever 19 and the slide member 50.

Below the projections 51 and 52, two mode changeover switches 37 and 38 (a mode changeover first switch 37 and a mode changeover second switch 38) are provided. The two mode changeover switches 37 and 38 are spaced by a predetermined distance in the slide direction (right and left direction) of the mode changeover lever 19. The distance between the mode changeover switches 37 and 38 is the same as the distance between the projections 51 and 52.

Both the mode changeover switches 37 and 38 are known contact switches (microswitches) configured such that their contact points are brought into contact or separated depending on positions in an up and down direction of corresponding movable portions (a first movable portion 47 and a second movable portion 48). The movable portions 47 and 48 of the mode changeover switches 37 and 38 are provided to protrude on the upper surface side (i.e., side of the projections 51 and 52) of the corresponding mode changeover switches.

At normal times, the movable portions 47 and 48 protrude upward by a biasing force of a not shown biasing member. At this point, internal contact points are separated so that an electrically OFF state is produced. When the movable portions 47 and 48 are pushed downward by receiving a downward load from the upper side, the internal contact points are brought into contact so that an electrically ON state is produced.

The mode changeover switches 37 and 38 are, as shown in FIGS. 3A to 3D, turned ON or OFF in accordance with the position of the projections 51 and 52, i.e., in accordance with the set operation mode, which move integrally with the slide manipulation of the mode changeover lever 19 by the user. From each of the mode changeover switches 37 and 38, a binary signal corresponding to its own state (ON or OFF) is outputted. Specifically, in a case of an ON state, a binary signal indicating an ON state (e.g., voltage of several V (high level); H level signal) is outputted. In a case of an OFF state, a binary signal indicating an OFF state (e.g., voltage of 0 V (low level); L level signal) is outputted.

Figure 3A:
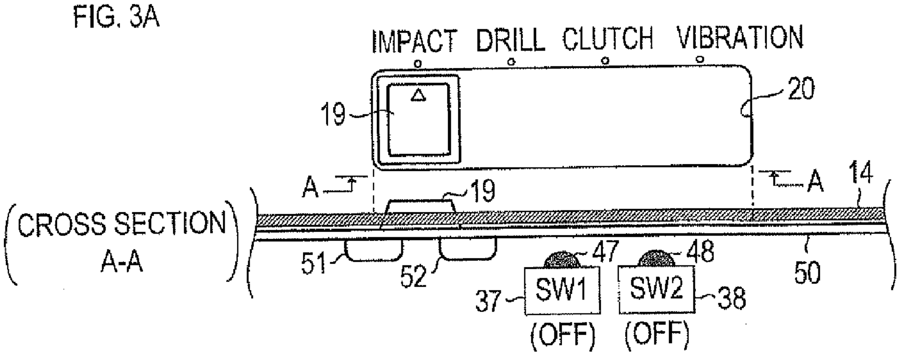
FIGS. 3A, 3B, 3C and 3D are explanatory views showing that on and off states of a mode changeover first switch and a mode changeover second switch is switched in conjunction with the mode changeover lever in the electric power tool.

Particularly, when the user slides and sets the mode changeover lever 19 to the "impact" set position in order to set the operation mode to the impact mode, the projections 51 and 52 formed on a lower side of the mode changeover lever 19 also move in conjunction with the slide manipulation. As shown in FIG. 3A, both the projections 51 and 52 are separated from the movable portions 47 and 48 of the mode changeover switches 37 and 38, respectively.

Thus, at the impact mode, the mode changeover switches 37 and 38 are both turned into an OFF state in which the contact points are separated. From the mode changeover switches 37 and 38, a binary signal (L level signal) indicating an OFF state is outputted. Thereby, from the mode changeover switches 37 and 38, a two-bit digital signal indicating the states of both the mode changeover switches is outputted as a whole. Specifically, for example, assuming that the binary signal from the mode changeover first switch 37 is a high-order bit and the binary signal from the mode changeover second switch 38 is a low-order bit, a digital signal of "00" is outputted in the case of the impact mode. The digital signal is inputted to the controller 31 (see FIG. 4) inside the electric power tool 10, as later described.

Figure 3B:
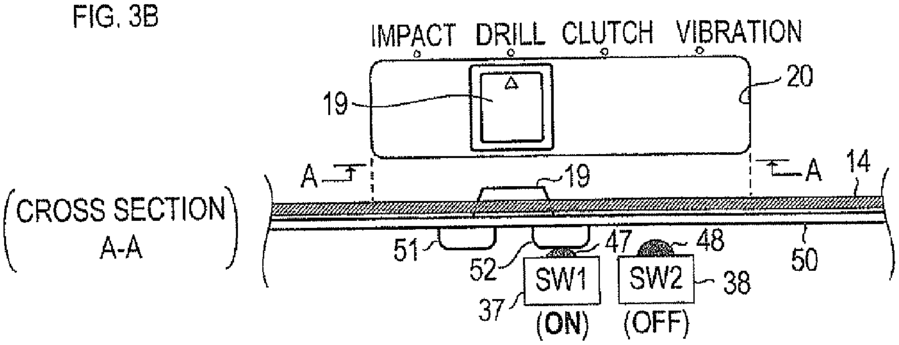

When the user slides and sets the mode changeover lever 19 to the "drill" set position in order to set the operation mode to the drill mode, the projections 51 and 52 formed on the lower side of the mode changeover lever 19 also move in conjunction with the slide manipulation. As shown in FIG. 3B, the second projection 52 is brought into contact with the first movable portion 47 of the mode changeover first switch 37, and depresses the first movable portion 47.

Thus, at the drill mode, the mode changeover first switch 37 is turned into an ON state in which the contact points are brought into contact. The mode changeover second switch 38 is turned into an OFF state in which the contact points are separated. From the mode changeover switch 37, a binary signal indicating an ON state (H level signal) is outputted. From the mode changeover switch 38, a binary signal indicating an OFF state (L level signal) is outputted. Thereby, from the mode changeover switches 37 and 38, a digital signal of "10" is outputted as a whole, and inputted to the controller 31 (see FIG. 4).

Figure 3C:
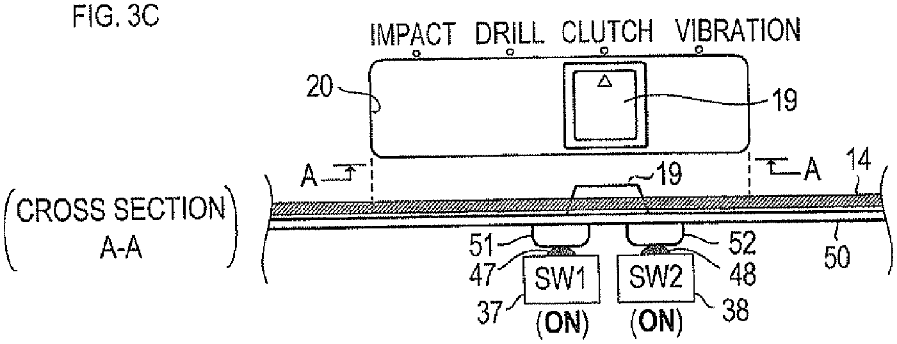

When the user slides and sets the mode changeover lever 19 to the "clutch" set position in order to set the operation mode to the clutch mode, the projections 51 and 52 formed on the lower side of the mode changeover lever 19 also move in conjunction with the slide manipulation. As shown in FIG. 3C, the projections 51 and 52 are both brought into contact with the movable portions 47 and 48 of the mode changeover switches 37 and 38, and depress the movable portions 47 and 48.

Thus, at the clutch mode, the mode changeover switches 37 and 38 are turned into an ON state in which the contact points are brought into contact. From the mode changeover switches 37 and 38, a binary signal (H level signal) indicating an ON state is outputted. Thereby, from the mode changeover switches 37 and 38, a digital signal of "11" is outputted as a whole, and inputted to the controller 31 (see FIG. 4).

Figure 3D:
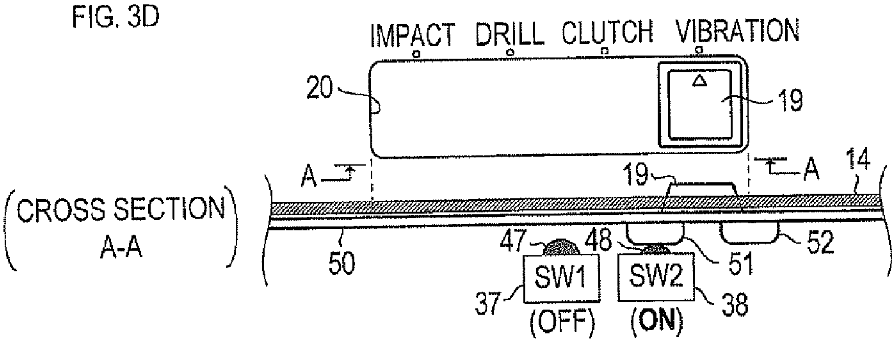

When the user slides and sets the mode changeover lever 19 to the "vibration" set position in order to set the operation mode to the vibration drill mode, the projections 51 and 52 formed on the lower side of the mode changeover lever 19 also move in conjunction with the slide manipulation. As shown in FIG. 3D, the first projection 51 is brought into contact with the second movable portion 48 of the mode changeover second switch 38, and depresses the second movable portion 48.

Thus, at the vibration drill mode, the mode changeover first switch 37 is turned into an OFF state in which the contact points are separated. The mode changeover second switch 38 is turned into an ON state in which the contact points are brought into contact. From the mode changeover switch 37, a binary signal (L level signal) indicating an OFF state is outputted. From the mode changeover switch 38, a binary signal (H level signal) indicating an ON state is outputted. Thereby, from the mode changeover switches 37 and 38, a digital signal of "01" is outputted as a whole, and inputted to the controller 31 (see FIG. 4).

As above, the electric power tool 10 of the present embodiment is configured to generate a digital signal indicating each of the four operation modes per operation mode and input the digital signal to the controller 31. Also, in order to generate a digital signal, the mode changeover switches 37 and 38 which are fewer than the operation modes in number (two which is half the number of the operation modes in the present embodiment) are used. A digital signal corresponding to each operation mode is generated by a combination of binary signals corresponding to the respective states of the mode changeover switches 37 and 38.

Figure 4:
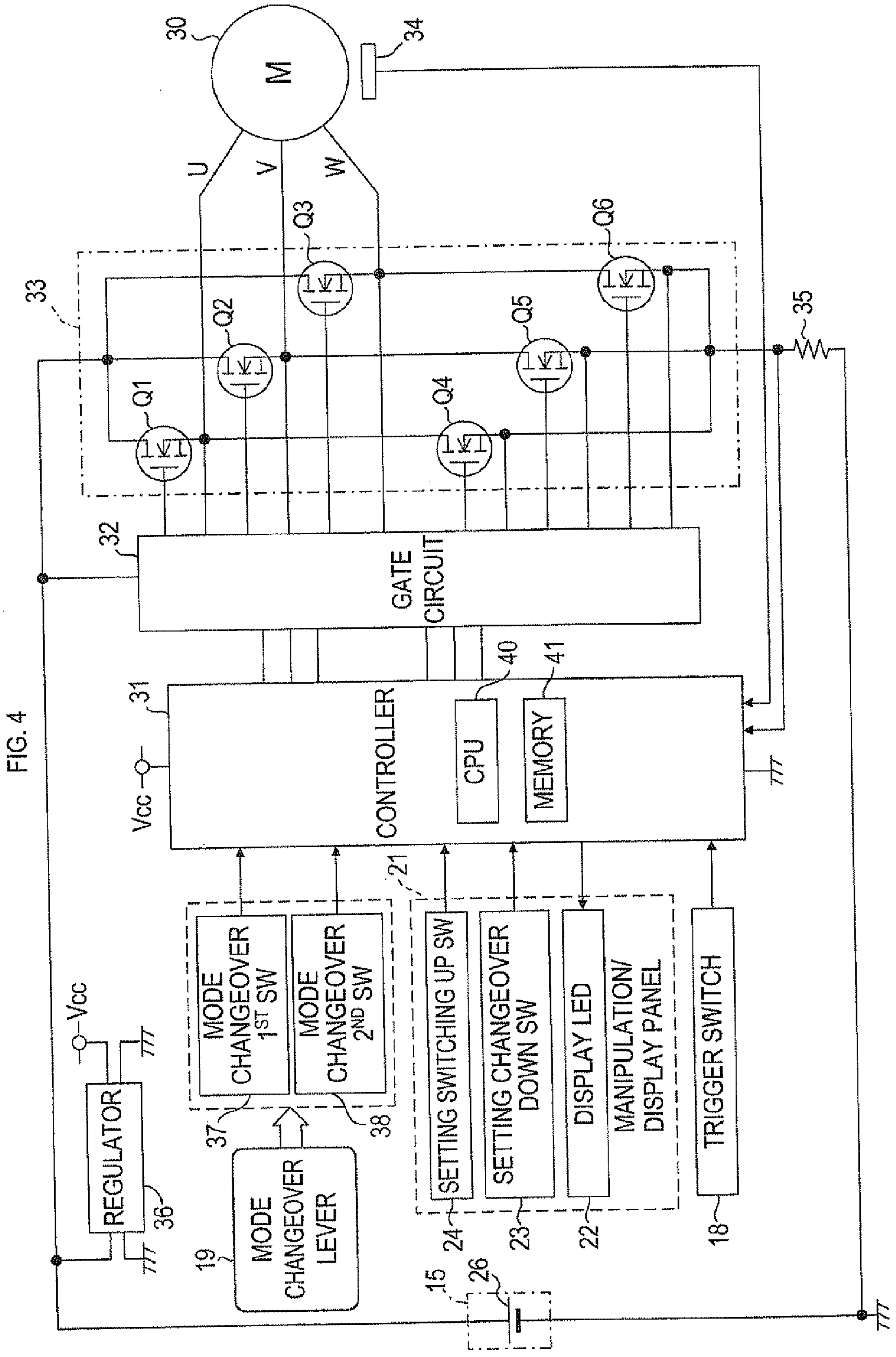
FIG. 4 is a configuration diagram showing an electrical structure of a drive unit which drives and controls a motor mounted on the electric power tool.

Next, a drive unit provided inside the electric power tool 10 for controlling rotation drive of the motor 30 will be described by way of FIG. 4. As shown in FIG. 4, the drive unit supplies DC power from a battery 26 inside the battery pack 15 to the motor 30 thereby to rotate and drive the motor 30. The battery 26 includes a not shown plurality of serially connected rechargeable battery cells which generate a predetermined DC voltage.

More particularly, the drive unit includes a motor drive circuit 33, a gate circuit 32, a controller 31, and a regulator 36. The aforementioned mode changeover switches 37 and 38, the manipulation/display panel 21, and the trigger switch 18 also constitute the drive unit.

The motor 30 of the present embodiment is configured as a three-phase brushless DC motor. Terminals U, V and W in the motor 30 are connected to the battery pack 15 (more particularly, the battery 26) via the motor drive circuit 33. Each of the terminals U, V and W is connected to one of not shown three coils provided in the motor 30, in order to rotate a not shown rotor of the motor 30.

The motor drive circuit 33 is configured as a bridge circuit including six switching elements Q1 to Q6. The three switching elements Q1 to Q3 are so-called high side switches which connect each of the terminals U, V and W of the motor 30 to a positive electrode side of the battery 26. The three switching elements Q4 to Q6 are so-called low side switches which connect each of the terminals U, V and W of the motor 30 to a negative electrode side of the battery 26. The switching elements Q1 to Q6 in the present embodiment are known MOSFETs.

The gate circuit 32 is connected to the controller 31. The gate circuit 32 is also connected to each gate and source of the switching elements Q1 to Q6. The gate circuit 32, based on control signal inputted to the gate circuit 32 from the controller 31 to control ON/OFF of each of the switching elements Q1 to Q6, applies switching voltage to turn ON/OFF each of the switching elements Q1 to Q6 to between the gate and the source of each of the switching elements Q1 to Q6, thereby to turn ON/OFF each of the switching elements Q1 to Q6.

The regulator 36 steps down a DC voltage (e.g., 14.4VDC) generated by the battery 26 to generate a control voltage Vcc (e.g., 5VDC) as a predetermined DC voltage, and applies the generated control voltage Vcc to predetermined circuits, including the controller 31, inside the drive unit.

The controller 31 in the present embodiment is configured as a so-called one chip microcomputer, as an example. The controller 31 includes a CPU 40, a memory 41, an input/output (I/O) port, an A/D converter, a timer and others. The memory 41 includes a ROM, a RAM, and a rewritable non-volatile memory chip (e.g., a flash ROM, an EEPROM, etc.). The CPU 40 executes various processes according to various programs stored in the memory 41.

The aforementioned mode changeover switches 37 and 38, the setting changeover switches 23 and 24 and the display LED 22 constituting the manipulation/display panel 21, the trigger switch 18, a rotation position sensor 34 provided in the motor 30, and a shunt resistance are connected to controller 31. The shunt resistance 35 is serially inserted to an energizing path of the motor 30.

As noted above, from each of the mode changeover switches 37 and 38, a binary signal (H level or L level) corresponding to the set position of the mode changeover lever 19 is inputted to the controller 31 as a two-bit digital signal as a whole. The controller 31, based on the inputted digital signal, determines at which operation mode the electric power tool 10 is set, and then controls the motor 30 by the control method based on a result of the determination.

In the present embodiment, three types of control methods, i.e., single speed control, impact control, and electronic clutch control, are provided for the control methods of the motor 30 by the controller 31, as shown in FIG. 5. The controller 31 employs the single speed control when the operation mode is set at the drill mode or the vibration drill mode, employs the impact control when the operation mode is set at the impact mode, and employs the electronic clutch control when the operation mode is set at the clutch mode.

By way of FIG. 5, more particular explanation will be given on the operation modes of each portion inside the electric power tool 10 at each operation mode.

When the operation mode is set at the drill mode by the slide manipulation of the mode changeover lever 19, the transmission mechanism in the drive force transmission unit 45 is switched to the drill mechanism 55, in conjunction with the slide manipulation. Also, the mode changeover first switch 37 is turned ON, and the mode changeover second switch 38 is tuned OFF, so that a digital signal of "10" is inputted to the controller 31 from the switches 37 and 38. Thereby, the controller 31 determines that the currently set operation mode is the drill mode and controls the motor 30 by the single speed control.

The single speed control is a control method in which the motor 30 is rotated at a rotation speed in accordance with a pulled amount (manipulation variable) of the trigger switch 18 by the user, up to a predetermined maximum rotation frequency.

In more detail, the trigger switch 18 of the present embodiment includes a drive start switch and a known variable resistor (e.g., a known potentiometer). The drive start switch detects whether or not the trigger switch 18 is pulled. The variable resistor is to detect the pulled amount of the trigger switch 18. When the trigger switch 18 is pulled, a signal corresponding to the pulled amount is inputted to the controller 31 from the trigger switch 18.

Thus, the controller 31 in the single speed control controls the motor 30 such that the motor 30 rotates at a rotation frequency corresponding to the pulled amount, based on the signal inputted from the trigger switch 18, i.e., the signal corresponding to the pulled amount. The controller 31 uses a signal from the rotation position sensor 34 to control the rotation frequency. The rotation position sensor 34 in the present embodiment includes a Hall element, and is configured to output a pulse signal to the controller 31 each time the rotation position of the rotor of the motor 30 reaches a predetermined rotation position (i.e., each time the motor 30 is rotated a predetermined amount).

The controller 31 calculates the actual rotation position and rotation frequency of the motor 30 based on the pulse signal from the rotation position sensor 34, and controls the motor 30 via the gate circuit 32 and the motor drive circuit 33 so that the calculated rotation frequency coincides with a set rotation frequency defined in accordance with the pulled amount of the trigger switch 18.

More particularly, the controller 31 sets a duty ratio of a voltage (drive voltage) applied to each of the terminals U, V and W of the motor 30 via the gate circuit 32 and the motor drive circuit 33, so that the larger the pulled amount of the trigger switch 18 is, the larger the rotation frequency becomes, up to the set maximum rotation frequency. In the present embodiment, the motor 30 is controlled such that the set rotation frequency is increased in proportion to the pulled amount of the trigger switch 18, and reaches the maximum rotation frequency when the pulled amount is the maximum, as an example.

Thus, when the operation mode is set at the drill mode, the motor 30 is controlled by the single speed control. Rotation of the motor 30 by the single speed control is transmitted to the sleeve 17 via the drill mechanism 55. Thereby, the tool bit is operated at the drill mode.

When the operation mode is set at the clutch mode by the slide manipulation of the mode changeover lever 19, the transmission mechanism in the drive force transmission unit 45 is switched to the drill mechanism 55, in conjunction with the slide manipulation. Also, the mode changeover first switch 37 and the mode changeover second switch 38 are both turned ON, so that a digital signal of "11" is inputted to the controller 31 from the switches 37 and 38. Thereby, the controller 31 determines that the currently set operation mode is the clutch mode and controls the motor 30 by the electronic clutch control.

Similar to the single speed control, in the electronic clutch control, the motor 30 is basically controlled to be rotated at a rotation frequency corresponding to the pulled amount of the trigger switch 18. On the other hand, the electronic clutch control is a control of monitoring a rotation torque of the tool bit (rotation torque of the sleeve 17) and stopping the rotation of the motor 30 in case that the rotation torque reaches or exceeds a predetermined set torque value.

In the present embodiment, the rotation torque of the tool bit is not directly detected. The rotation torque of the tool bit is indirectly detected by detecting an output torque of the motor 30. Particularly, a voltage at one end side opposite to a ground potential side, in the shunt resistance 35 provided in the energizing path of the motor 30, is inputted to the controller 31. The controller 31 detects the output torque of the motor 30, based on the voltage inputted from the shunt resistance 35.

As is known, an output torque of a motor is proportional to a current flowing to the motor. Thus, if a value of the current flowing to the motor can be detected, the output torque of the motor can be detected, and further a rotation torque of a tool bit can be detected. The current flowing to the motor can be calculated from voltages at both ends of a shunt resistance inserted to an energizing path of the current. Thus, in the present embodiment, the shunt resistance 35 is inserted to the energizing path of the motor 30 to detect the voltages at both ends of the shunt resistance 35.

The controller 31 monitors the rotation torque of the tool bit based on a detection value from the shunt resistance 35. When the rotation torque reaches or exceeds the predetermined set torque value, the controller 31 stops the rotation of the motor 30.

Specifically, at a clutch mode of a conventional electric power tool, a function as the clutch mode is achieved by a mechanical transmission mechanism. In contrast, at the clutch mode of the electric power tool 10 of the present embodiment, the same drill mechanism 55 as that at the drill mode is used for a mechanical transmission mechanism. The rotation of the motor 30 is only transmitted simply as is or with deceleration to the tool bit.

The characteristic operation as the clutch mode, i.e., operation not to transmit the rotation of the motor 30 to the tool bit (that is, to stop the rotation of the tool bit) when the set torque value is reached, is achieved by an electric control method. Specifically, in the single speed control at the drill mode, the motor 30 continues to be operated as long as the trigger switch 18 is pulled. In the electronic clutch control at the clutch mode, when the rotation torque reaches the set torque value, the electronic clutch function is operated so as not to rotate the tool bit at a rotation torque larger than the set torque value. Specifically, even if the trigger switch 18 is pulled, rotation of the motor 30 is stopped. Thereby, although the mechanical transmission mechanism is the drill mechanism 55, an operation equivalent to an operation at the clutch mode by a conventional mechanical mechanism is achieved as a whole tool.

Figure 6A:
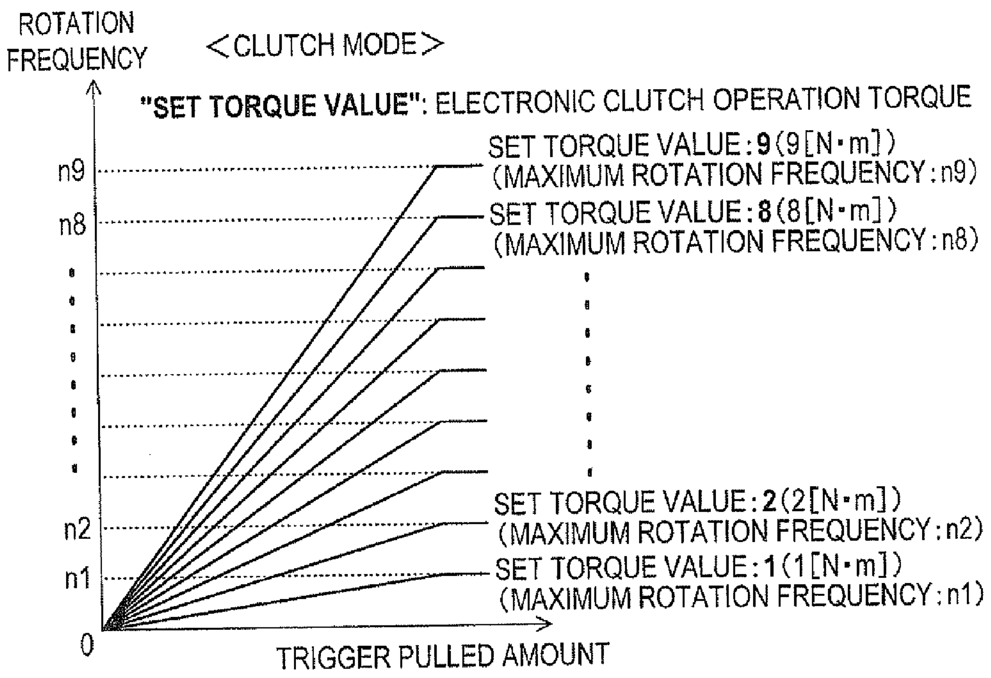
FIGS. 6A and 6B are explanatory views showing a set torque value which can be changed in a stepwise fashion by a user of the electric power tool at a clutch mode, and a maximum rotation frequency setting which can be changed in a stepwise fashion by the user at an impact mode.

Further, the electronic clutch control of the present embodiment is configured such that the user can change the set torque value. Specifically, in the electronic clutch control of the present embodiment, as illustrated in FIG. 6A, the set torque value is set at nine levels by 1 [N·m] from a set torque value 1 (1[N·m]) to a set torque value 9 (9 [N·m]). The user can set the set torque value to one of the set torque values. The particular values of the above set torque values (1 [N·m] to 9 [N·m]) are merely examples.

Also, in the electronic clutch control of the present embodiment, a maximum rotation frequency is individually set per set torque value of nine levels. Specifically, as shown in FIG. 6A, for the set torque value 1, the maximum rotation frequency is set at a predetermined rotation frequency n1. As the set torque value is increased to 2, 3, 4, . . . in a stepwise fashion, the corresponding maximum rotation frequency is increased to n2, n3, n4, . . . at the same interval. At the maximum set torque value 9, the maximum rotation frequency is n9, which is the maximum.

Thus, in the electronic clutch control, when the user sets the torque value to one of the set torque values 1 to 9, the controller 31 performs the same single speed control mentioned above, up to the maximum rotation frequency set in accordance with the set torque value. While performing the same control as the single speed control, the controller 31, when the detected rotation torque reaches and exceeds the set torque value, forcibly stops the rotation of the motor 30 even if the trigger switch 18 is being pulled or regardless of the rotation frequency at the time.

Torque value setting by the user in the electronic clutch control is enabled by the manipulation/display panel 21. The configuration, manipulation method, display content, etc. of the manipulation/display panel 21 will be described later.

When the operation mode is set at the impact mode by the slide manipulation of the mode changeover lever 19, the transmission mechanism in the drive force transmission unit 45 is switched to the impact driver mechanism 56, in conjunction with the slide manipulation. Also, the mode changeover first switch 37 and the mode changeover second switch 38 are both turned OFF, so that a digital signal of "00" is inputted to the controller 31 from the switches 37 and 38. Thereby, the controller 31 determines that the currently set operation mode is the impact mode and controls the motor 30 by the impact control.

The impact control is basically the same control as the single speed control. In the impact control, the motor 30 is controlled to be rotated at a rotation frequency corresponding to the pulled amount of the trigger switch 18. The impact control is different from the above-described single speed control in that, the maximum rotation frequency in the single speed control is set to a fixed value in advance, while the maximum rotation frequency in the impact control can be changed by the user.

Figure 6B:
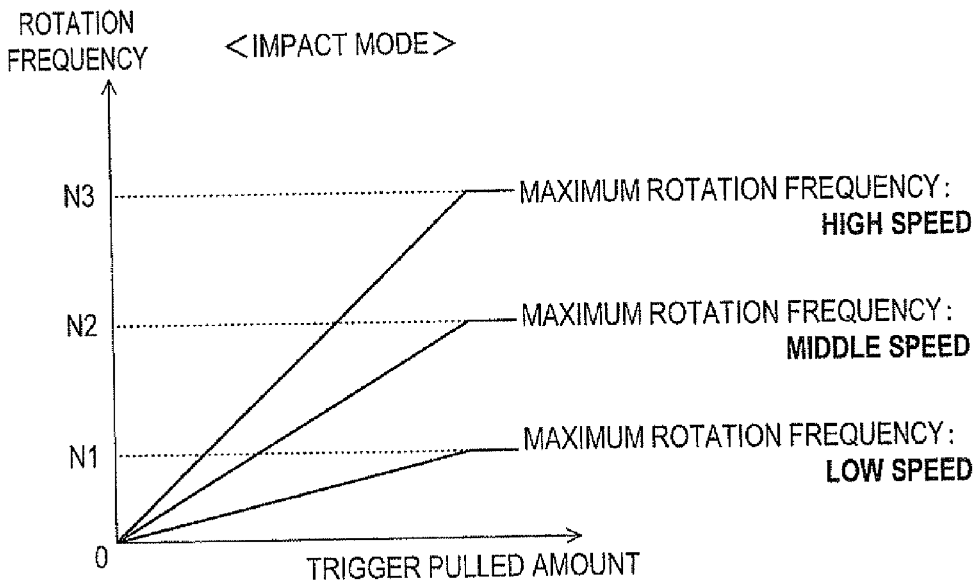

Specifically, the impact control of the present embodiment, as shown in FIG. 6B, is configured such that the maximum frequency can be switched to one of the three levels of low speed having a predetermined rotation frequency N1, middle speed having a rotation frequency N2 which is larger than the low speed rotation frequency N1 by a predetermined amount, and high speed having a rotation frequency N3 which is larger than the middle speed rotation frequency N2 by a predetermined amount. Other than the point that the maximum rotation frequency is switchable, the impact control is the same as the aforementioned single speed control. The motor 30 is controlled such that the rotation frequency is increased up to the set maximum rotation frequency, in accordance with (in proportion to, in the present embodiment) the pulled amount of the trigger switch 18.

The setting of the maximum rotation frequency by the user in the impact control is enabled by the manipulation/display panel 21, as is the case with the torque value setting in the electronic clutch control. The configuration, manipulation method, detail content, etc. of the manipulation/display panel 21 will be described later.

When the operation mode is set at the vibration drill mode by the slide manipulation of the mode changeover lever 19, the transmission mechanism in the drive force transmission unit 45 is switched to the vibration drill mechanism 57, in conjunction with the slide manipulation. Also, the mode changeover first switch 37 is turned OFF, and the mode changeover second switch 38 is turned ON, so that a digital signal of "01" is inputted to the controller 31 from the switches 37 and 38. Thereby, the controller 31 determines that the currently set operation mode is the vibration drill mode and controls the motor 30 by the single speed control.

Here, description will be given on the manipulation/display panel 21 which is operated by the user to change the aforementioned control parameters (the set torque value and the maximum rotation frequency) at the impact mode (impact control) and the clutch mode (electronic clutch control).

As shown in FIG. 4, and also in FIG. 1, the manipulation/display panel 21 is provided with the two setting changeover switches 23 and 24 (the setting changeover down switch 23 and the setting changeover up switch 24) and the display LED 22. The setting changeover switches 23 and 24 are operated by the user. The display LED 22 displays a current value of the control parameter which, in case that the currently set operation mode is the impact mode or the clutch mode, can be set at the operation mode.

The setting changeover switches 23 and 24 are connected to the controller 31. Contents of manipulation of each of the setting changeover switches 23 and 24 are transmitted to the controller 31. Thereby, the controller 31 displays the control parameter currently set at the operation mode on the display LED 22 when the operation mode is set at the impact mode or the clutch mode.

The latest values of the control parameters which can be changed at the impact mode and the clutch mode, respectively, are stored in the memory 41. The stored contents are maintained even if the battery pack 15 is removed from the electric power tool 10 and power is no longer supplied to the controller 31.

Figure 7:
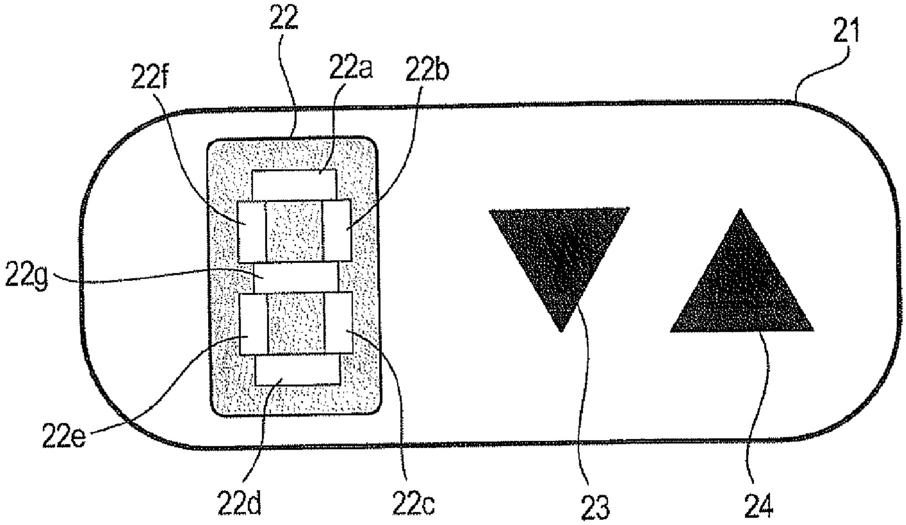
FIG. 7 is an explanatory view showing a configuration of a manipulation/display panel.

Each of the setting changeover switches 23 and 24 is formed into a shape as shown in FIG. 7 (and FIG. 1). When the user depresses the setting changeover switches 23 and 24, the changeable control parameters can be increased or decreased. The setting changeover switches 23 and 24 are shared between both the impact mode and the clutch mode.

The display LED 22, as shown in FIG. 7 (and FIG. 1) is a known seven-segment LED which includes seven LEDs from a first LED 22*a* to a seventh LED 22*g*. On the display LED 22, when the operation mode is set at the impact mode or the clutch mode, the current value of the control parameter which can be changed by the user at the set operation mode is displayed.

At the drill mode and the vibration drill mode, there is not parameter which can be changed by the user. Thus, when the operation mode is set at the drill mode or the vibration drill mode, the display LED 22 is turned off and displays nothing.

The display LED 22 is also shared between both the impact mode and the clutch mode. However, the display methods are different between the maximum rotation frequency at the impact mode and the set torque value at the clutch mode. Thus, by checking the contents displayed on the display LED 22, not only the current value of the control parameter but also at which operation mode the current operation mode is can be known.

Figure 8A:
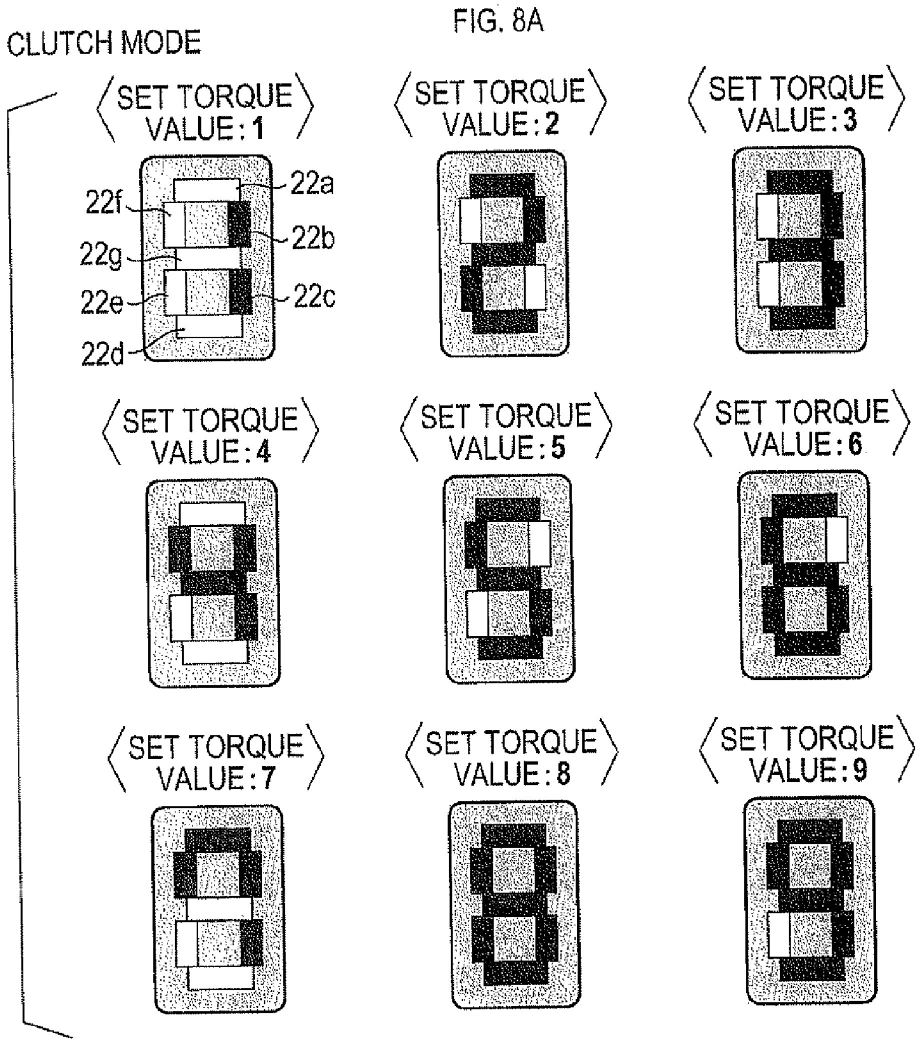
FIG. 8A is an explanatory view showing the set torque value displayed on a display LED at the clutch mode.

In the case at the clutch mode, as shown in FIG. 8A, the set torque values 1 to 9 which can be set at the clutch mode are displayed on the display LED 22 in Arabic numerals.

When the set torque value is set in 1, the second LED 22*b* and the third LED 22*c* are turned on and "1" is displayed. Regarding the other set torque values 2 to 9, as shown in FIG. 8A, the corresponding LEDs (e.g., in the case of the set torque value 7, the first LED 22*a*, the second LED 22*b*, the third LED 22*c*, and the sixth LED 22F) are turned on to display a numeral indicating the corresponding set torque value.

Figure 8B:
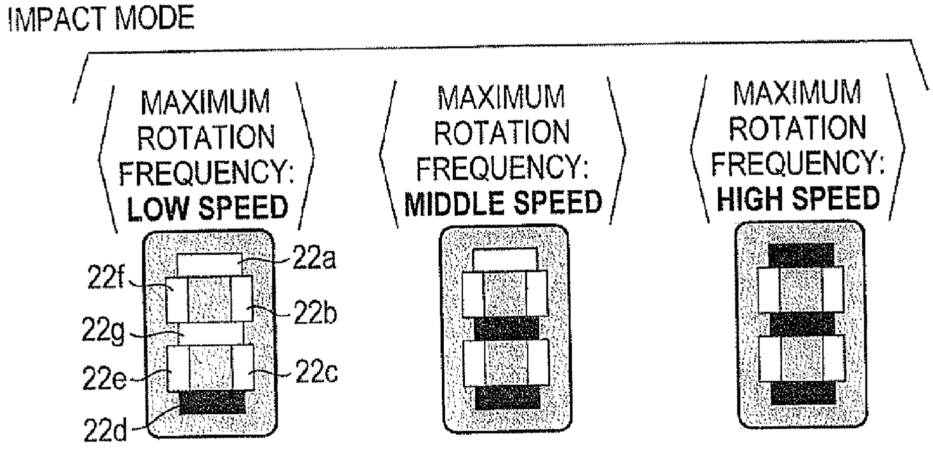
FIG. 8B is an explanatory view showing the maximum rotation frequency setting displayed on the display LED at the impact mode.

On the other hand, the parameter of the maximum rotation frequency in the case at the impact mode is not displayed in numerals as in the case at the clutch mode. As shown in FIG. 8B, the parameter is displayed by horizontal bars in three levels. When the maximum rotation frequency is set at low speed, the fourth LED 22*d* is turned on to display one horizontal bar. When the maximum rotation frequency is set at middle speed, the fourth LED 22*d* and the seventh LED 22*g* are turned on to display two horizontal bars. When the maximum rotation frequency is set at high speed, the fourth LED 22*d*, the seventh LED 22*g* and the first LED 22*a* are turned on to display three horizontal bars.

As above, in the present embodiment, the control parameters at the two different operation modes are displayed on the same and single display LED 22. Further, depending on the operation mode (i.e., type of control parameter), the display methods on the display LED 22 are different. Change of the control parameters in these two operation modes can be achieved by manipulating the same single pair of the setting changeover switches 23 and 24.

Thus, if it is desired to change the current set torque value to a smaller set torque value, for example, upon changing the set torque value at the clutch mode, the setting changeover down switch 23 is depressed so that the set torque value can be decreased to a smaller value by one level than the current value. For example, if the setting changeover down switch 23 is depressed when the set torque value is set in 8 (8 [N·m]), the set torque value is changed to 7 (7 [N·m]). To the contrary, if it is desired to change the current set torque value to a larger set torque value, the setting changeover up switch 24 is depressed so that the set torque value can be increased to a larger value by one level than the current value. For example, if the setting changeover up switch 24 is depressed when the set torque value is set in 1 (1 [N·m]), the set torque value is changed to 2 (2 [N·m]).

Change of the maximum rotation frequency at the impact mode can be made by manipulating the setting changeover switches 23 and 24 in the same manner as in the case of changing the set torque value at the clutch mode. For example, if it is desired to change the maximum rotation frequency to a smaller maximum rotation frequency, the setting changeover down switch 23 is depressed so that the maximum rotation frequency can be switched to a smaller value by one level than the current value. For example, if the setting changeover down switch 23 is depressed when the maximum rotation frequency is set at middle speed, the maximum rotation frequency is switched to low speed. To the contrary, if it is desired to change the current maximum rotation frequency to a larger maximum rotation frequency, the setting changeover up switch 24 is depressed so that the maximum rotation frequency can be switched to a larger value by one level than the current value. For example, if the setting changeover up switch 24 is depressed when the maximum rotation frequency is set at middle speed, the maximum rotation frequency is switched to high speed.

How to operate the setting changeover down switch 23 when depressed in case that the currently set control parameter is the minimum value within the switchable range can be arbitrarily determined. For example, when the setting changeover down switch 23 is depressed when the currently set control parameter is already the minimum value, the parameter may remain unchanged, or, for example, the parameter may be set in the maximum value.

Also, how to operate the setting changeover up switch 24 when depressed in case that the currently set control parameter is the maximum value within the switchable range can be arbitrarily determined. For example, when the setting changeover up switch 24 is depressed when the currently set control parameter is already the maximum value, the parameter may remain unchanged, or, for example, the parameter may be set in the minimum value.

When the user keeps depressing, i.e., pressing and holding the setting changeover down switch 23, the control parameter is sequentially decreased by one level at a predetermined time interval, in the present embodiment. When decreased to the minimum value within the switchable range, the control parameter is maintained at the minimum value even if the setting changeover down switch 23 is kept pressed and held. This is only an example. Operation may be repeated such that the control parameter is switched to the maximum value after decreased to the minimum value, and then sequentially decreased by one level to the minimum value again, while the setting changeover down switch 23 is kept pressed and held.

The same applies to the setting changeover up switch 24. When the user presses and holds the setting changeover up switch 24, the control parameter is sequentially increased by one level at a predetermined time interval, in the present embodiment. When increased to the maximum value within the switchable range, the control parameter is maintained at the maximum value even if the setting changeover up switch 24 is kept pressed and held. This is only an example. Operation may be repeated such that the control parameter is switched to the minimum value after increased to the maximum value, and then sequentially increased by one level to the maximum value again, while the setting changeover up switch 24 is kept pressed and held.

Also, the time interval upon the sequential change (decrease or increase) of the control parameter during the press and hold may not be necessarily constant. For example, upon start of pressing, the time interval may be longer and slower, and then gradually become shorter and faster. As such, the time interval at which the control parameter is changed during the press and hold can be arbitrarily determined.

Further, in the present embodiment, when the user presses the setting changeover down switch 23 twice within a predetermined short time, i.e., double clicks the setting changeover down switch 23, the control parameter is set in the minimum value. To the contrary, when the user double clicks the setting changeover up switch 24, the control parameter is set in the maximum value.

Figure 9:
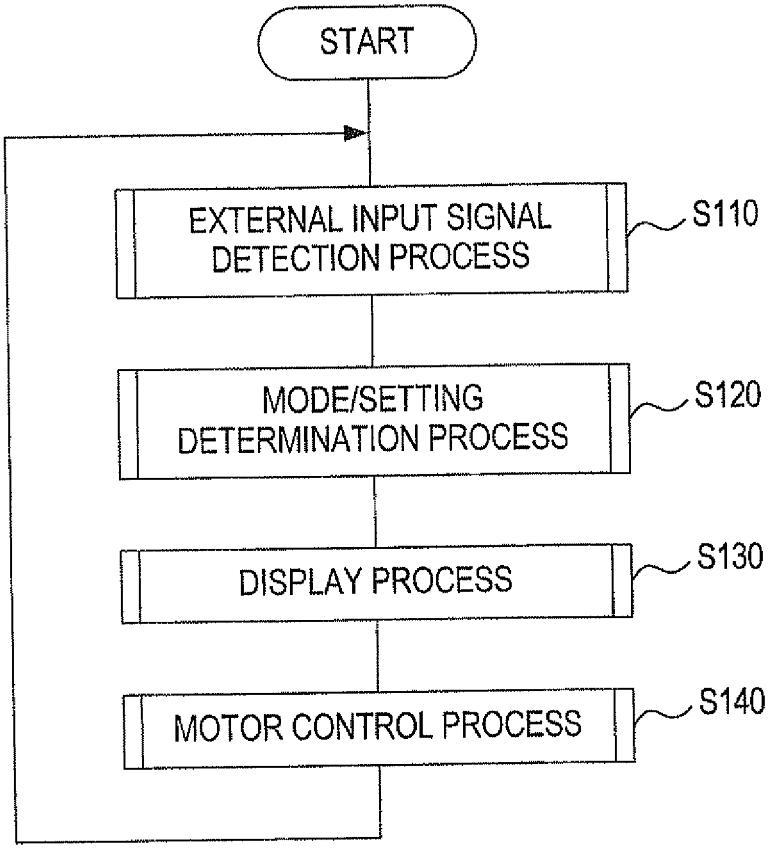
FIG. 9 is a flowchart illustrating a flow of a main control process executed by a controller 31.

Next, a main control process executed by the controller 31 (executed by the CPU 40, in detail) in order to implement the various operation of the controller 31 as noted above will be described by way of FIG. 9. The controller 31 is started when the battery pack 15 is attached to the electric power tool 10 and the control voltage Vcc is applied to the controller 31. The controller 31 executes the main control process shown in FIG. 9.

The controller 31, when the main control process is started, executes an external input signal detection process in S110, firstly. The external input signal detection process is a process of accepting inputs of various signals and data necessary for performing various controls such as control of the motor 30 and display control of the display LED 22.

In the present embodiment, inputs of various signals are accepted such as the trigger signal corresponding to the pulled amount of the trigger switch 18 inputted from the trigger switch 18, the binary signal (i.e., digital signal indicating the operation mode) from the mode changeover first switch 37 and the mode changeover second switch 38 which are turned ON or OFF by the slide manipulation of the mode changeover lever 19, the signal from the setting changeover down switch 23 and the setting changeover up switch 24 manipulated by the user to change the control parameter in the case at the impact mode or the clutch mode, the voltage signal indicating the rotation torque inputted from the shunt resistance 35, the pulse signal from the rotation position sensor 34, and so on. Based on the accepted various signals, the control parameters stored in the memory 41 are updated.

Figure 10A:
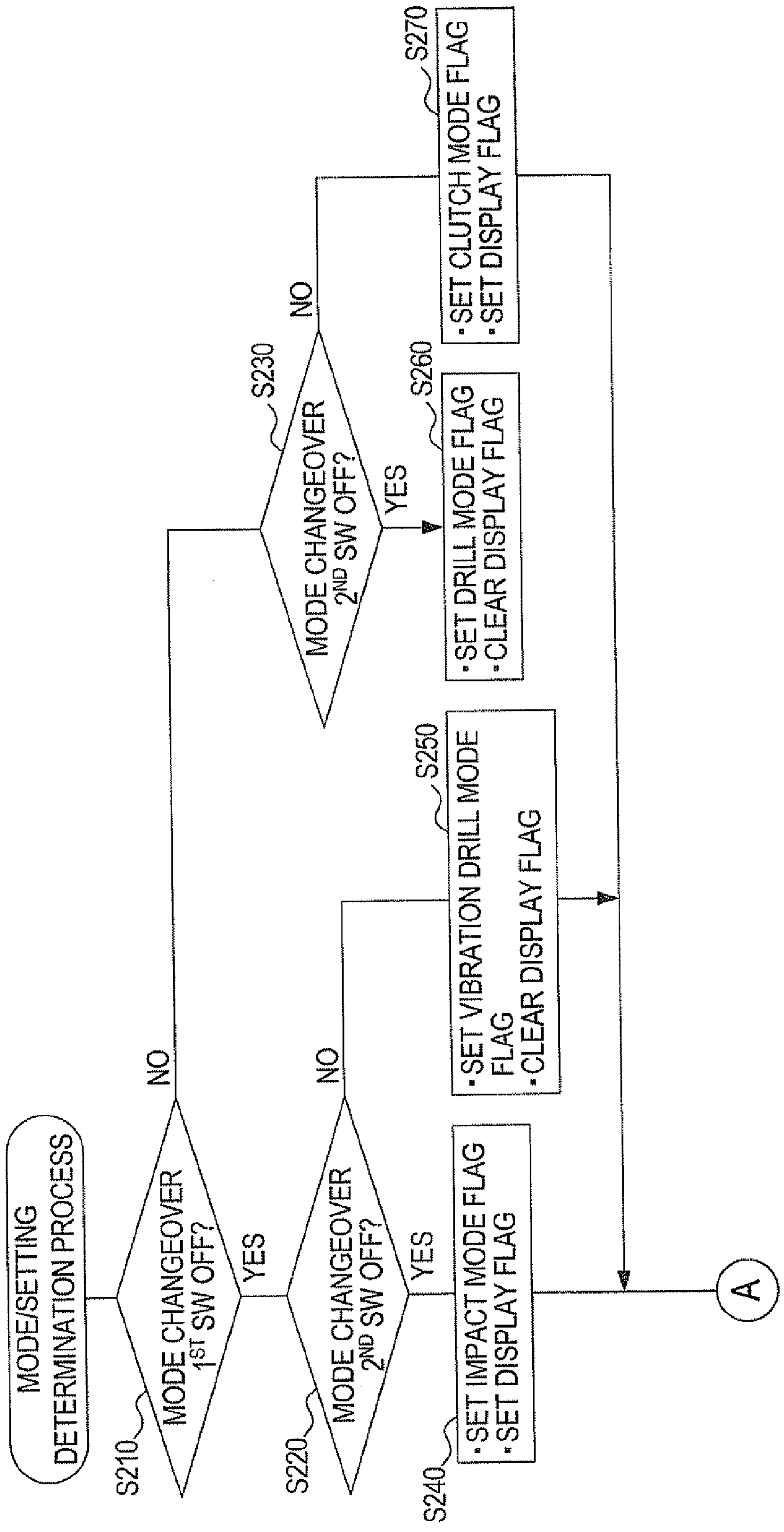
FIGS. 10A and 10B are a flowchart illustrating a flow of a mode setting determination process in S120 in the main control process of FIG. 9.
Figure 10B:
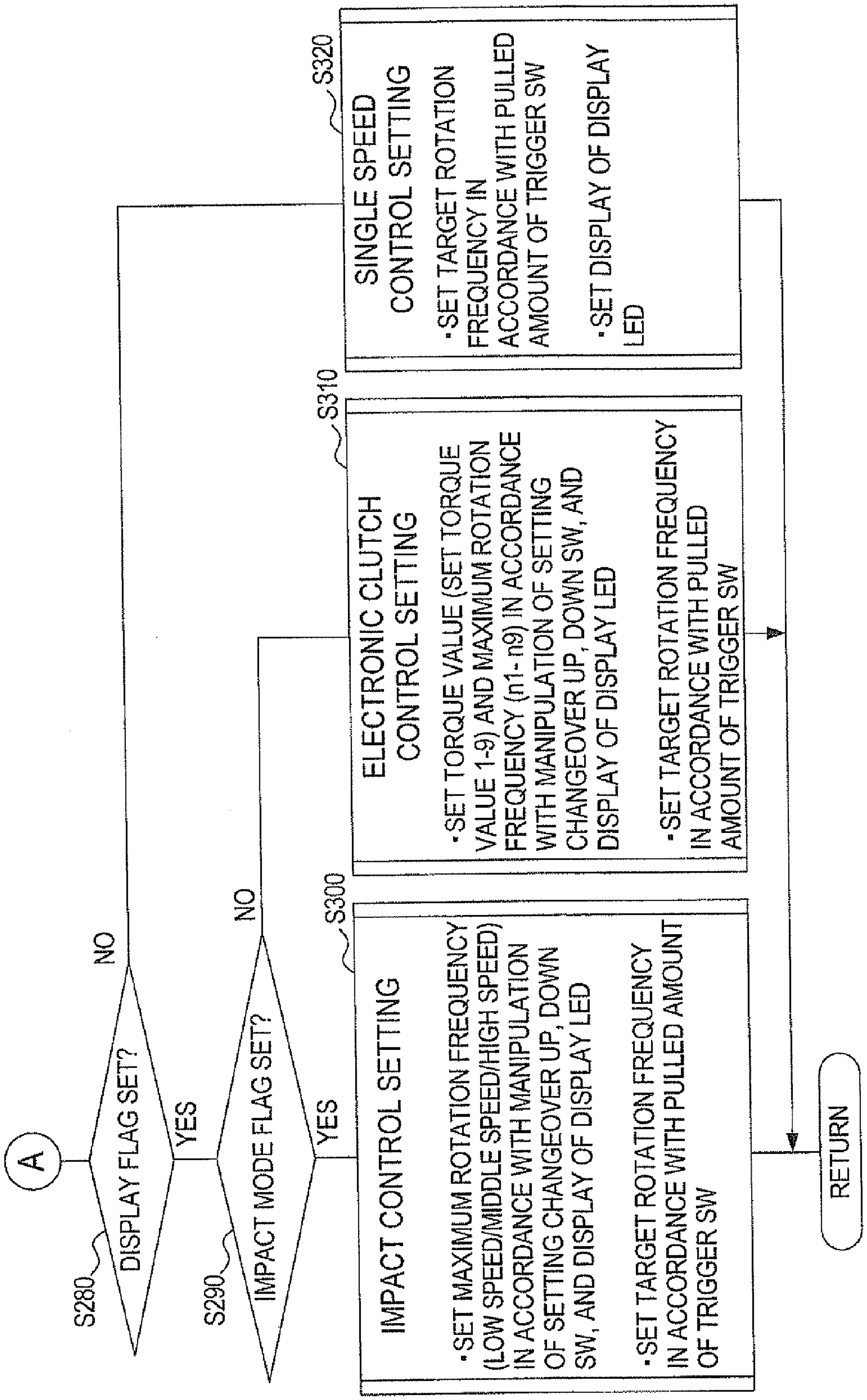

In S120, a mode/setting determination process is executed. The particulars of the mode/setting determination process are as shown in FIGS. 10A and 10B. Firstly, in S210, it is determined whether or not the mode changeover first switch 37 is turned OFF. If the mode changeover first switch 37 is turned OFF, it is further determined in S220 whether or not the mode changeover second switch 38 is turned OFF.

If the mode changeover second switch 38 is turned OFF, it is determined that the operation mode is set at the impact mode. Thus, in S240, an impact mode flag is set and a display flag is set. The process moves to S280. Here, the impact mode flag is a flag indicating whether or not the operation mode is set at the impact mode. By setting this flag, the controller 31 can acknowledge that the current operation mode is the impact mode.

The display flag is a flag to determine whether or not to make the display LED 22 displayed in the manipulation/display panel 21. This flag is set at the impact mode and the clutch mode at which the user can change the control parameter. Accordingly, the controller 31, when the operation mode is set at the impact mode or the clutch mode and the display flag is set, displays the current value of the control parameter at the currently set operation mode on the display LED 22. If the display flag is not set, the display LED 22 is not displayed.

Conversely, the display flag can be a flag indicating whether or not the operation mode is set at the operation mode at which the single speed control is used as the control method of the motor 30, i.e., whether or not the operation mode is set at the drill mode or the vibration drill mode at which there is no control parameter to be changed by the user.

In S220, when the mode changeover second switch 38 is not turned OFF (i.e., is turned ON), the operation mode is set at the vibration drill mode. Thus, in S250, a vibration drill mode flag is set and the display flag is cleared. The process moves to S280. Here, the vibration drill mode flag is a flag indicating whether or not the operation mode is set at the vibration drill mode. By setting this flag, the controller 31 can acknowledge that the current operation mode is the vibration drill mode.

On the other hand, in 8210, if it is determined that the mode changeover first switch 37 is not turned OFF (i.e., is turned ON), it is determined in S230 whether or not the mode changeover second switch 38 is turned OFF.

If it is determined in S230 that the mode changeover second switch 38 is turned OFF, the operation mode is set at the drill mode. Thus, in S260, a drill mode flag is set and the display flag is cleared. The process moves to S280. Here, the drill mode flag is a flag indicating whether or not the operation mode is set at the drill mode. By setting this flag, the controller 31 can acknowledge that the current operation mode is the drill mode.

If it is determined in S230 that the mode changeover second switch 38 is not turned OFF (i.e., is turned ON), the operation mode is set at the clutch mode. Thus, in S270, a clutch mode flag is set and the display flag is set. The process moves to S280. Here, the clutch mode flag is a flag indicating whether or not the operation mode is set at the clutch mode. By setting this flag, the controller 31 can acknowledge that the current operation mode is the clutch mode.

In S280, it is determined whether or not the display flag is set. If it is determined that the display flag is set, the operation mode is set at one of the impact mode and the clutch mode. In subsequent S290, it is determined whether or not the impact mode flag is set. If set, the current operation mode is set at the impact mode. The process moves to S300. The controller 31 makes various settings for controlling the motor 30 at the impact mode.

When the impact mode flag is set, the controller 31 sets the maximum rotation frequency (low speed/middle speed/high speed), and the display LED 22, in accordance with the latest control parameters updated based on the signals from the setting changeover switches 23 and 24 in S110 and stored in the memory 41. Thereafter, if there is manipulation of the changeover switches 23 and 24 in the manipulation panel 21, change in the control parameter and the display content of the display LED 22 are accepted. Further, the target rotation frequency is set in accordance with the pulled amount of the trigger switch 18. After these various settings, the mode/setting determination process is ended. The process moves to a display process in S130 of FIG. 9.

In S290, if it is not determined that the impact mode flag is set, the current operation mode is set at the clutch mode. The process moves to S310. The controller 31 makes various settings for controlling the motor 30 at the clutch mode.

In S310, the controller 31 accepts the change in the set torque value (one of the set torque values 1 to 9) which is the control parameter at the clutch mode, in accordance with the latest control parameter updated based on the signals from the setting changeover switches 23 and 24 in S110 and stored in the memory 41. Then, based on the change of the accepted control parameter, the content to be displayed (one of the numerical indication of 1 to 9, in the case at the clutch mode) on the display LED 22 are set. Further, the target rotation frequency is set in accordance with the pulled amount of the trigger switch 18. After these various settings, the mode/setting determination process is ended. The process moves to a display process in S130 of FIG. 9.

On the other hand, if it is determined in S280 that the display flag is not set, the operation mode is set at the drill mode or the vibration drill mode. The process moves to S320. The controller 31 makes various settings for controlling the motor 30 at the single speed control.

In S320, the set rotation frequency in accordance with the pulled amount of the trigger switch 18, i.e., the target rotation frequency, is set. Also, display setting in order not to display anything on the display LED 22 is made. After these various setting, the mode/display determination process is ended. The process moves to a display process in S130 of FIG. 9.

Figure 11:
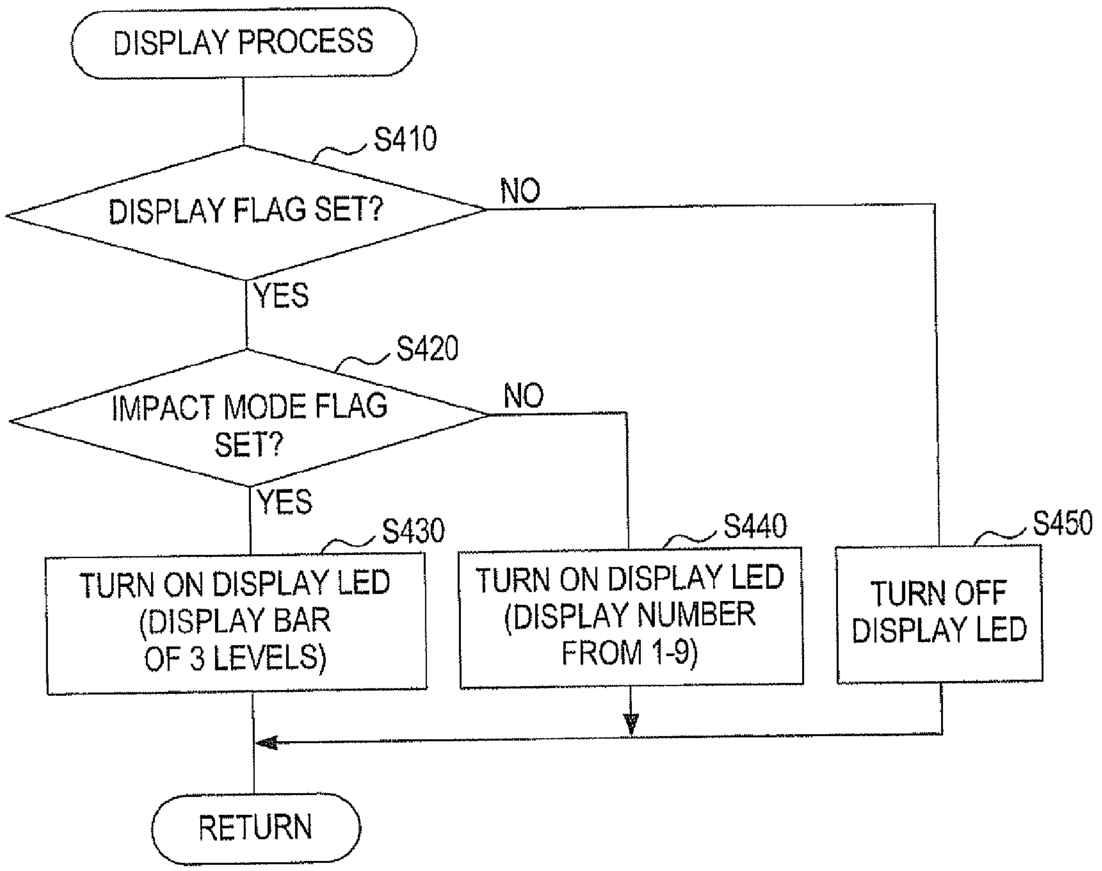
FIG. 11 is a flowchart illustrating a flow of a display process in S130 in the main control process of FIG. 9.

The display process in S130 is as shown in FIG. 11. Firstly, in S410, it is determined whether or not the display flag is set. If the display flag is not set, the operation mode is the drill mode or the vibration drill mode. There is no control parameter to be displayed on the display LED 22. The process moves to S450. The display LED 22 is turned off.

On the other hand, if it is determined in S410 that the display flag is set, it is determined in S420 whether or not the impact mode flag is set. If set, the current operation mode is the impact mode. The process moves to S430. The current value of the maximum rotation frequency as the control parameter which can be changed by the user at the impact mode is displayed on the display LED 22. The three-level horizontal bar indication corresponding to the currently set parameter (any of low speed, middle speed and high speed) is made using the seven LEDs 22*a* to 22*g* composing the display LED 22. When the display process is ended, the process moves to a motor control process (FIG. 9) in S140.

If it is not determined in S420 that the impact mode flag is set, the current operation mode is set at the clutch mode. The process then moves to S440. The current value of the set torque value as the control parameter which can be changed by the user at the clutch mode is displayed on the display LED 22. Specifically, numerical indication corresponding to the currently set parameter (any of the set torque values 1 to 9) is made using the seven LEDs 22*a* to 22*g* composing the display LED 22. When the display process is ended, the process moves to the motor control process (FIG. 9) in S140.

In the motor control process in S140, the rotation of the motor 30 is controlled according to the various control settings (S300, S310 or 5320) in the mode/setting determination process (see FIGS. 10A and 10B in detail) in S120. Thereby, the motor 30 is controlled based on the control method corresponding to the currently set operation mode.

As described in the above, the electric power tool 10 of the present embodiment has four operation modes of the impact mode, the drill mode, the clutch mode, and the vibration drill mode. The electric power tool 10 can be set to one of the operation modes by the user's sliding the mode changeover lever 19.

In order to implement the operation at the four operation modes, the electric power tool 10 includes the three types of mechanical transmission mechanisms (the drill mechanism 55, the impact driver mechanism 56, and the vibration drill mechanism 57), and the three types of control methods (the single speed control, the impact control, and the electronic clutch control).

Per set position of the mode changeover lever 19 (i.e., per operation mode), a combination of the transmission mechanism and the control method is predetermined. When the mode changeover lever 19 is slid to a desired set position, the transmission mechanism is switched to the transmission mechanism corresponding to the set position in conjunction with the slide manipulation. Also, a digital signal corresponding to the set position is inputted to the controller 31 from the mode changeover switches 37 and 38. Thereby, the control method of the motor 30 is set in the control method corresponding to the set position. In other words, manipulation of the one mode changeover lever 19 allows switching of the transmission mechanism and setting of the control method in synchronization.

As a result, the controller 31 controls the motor 30 by the set control method. The rotation of the motor 30 is transmitted to the sleeve 17 (and to the tool bit) via the switched transmission mechanism. Thereby, operation at the operation mode corresponding to the set position is implemented.

According to the electric power tool 10 of the present embodiment, a mechanical transmission mechanism is omitted or simplified, as compared to a conventional electric power tool which implements switching of the operation modes only by switching of the mechanical transmission mechanisms. Further, the motor 30 is controlled by an appropriate control method in accordance with the operation mode. Thereby, various operation modes equivalent to those as before can be implemented. Accordingly, both reduction in size and cost and improvement in performance of the electric power tool 10 can be achieved.

Especially, the electronic clutch control is provided as the control method. As a result, a clutch mechanism which had been conventionally implemented by a mechanical mechanism is implemented by an electric control. Thus, a mechanical clutch mechanism is no longer necessary. Reduction in size and weight of the electric power tool is achieved.

In the electric power tool 10 of the present embodiment, the user can select one of the nine levels of set torque values at the clutch mode. The user can also select one of the three levels of maximum rotation frequencies at the impact mode.

Thus, the user of the tool can operate a tool bit within a desired range of rotation torque at the clutch mode. Moreover, change of the set torque value is achieved not by switching of mechanical mechanisms but by electric control of a motor by a motor control unit. Thus, change of the set torque value can be implemented in a simpler manner than before. Also, at the impact mode, the tool bit can be rotated within a desired range up to the maximum rotation frequency. Moreover, change of the maximum rotation frequency is achieved not by switching of mechanical mechanisms but by electric control of a motor by the motor control unit. Thus, change of the maximum rotation frequency can be implemented in a simpler manner than before.

Further at the clutch mode, the maximum rotation frequency is set to be a larger value as the set torque value becomes larger, with respect to each of the nine levels of set torque values changeable by the user. In other words, the maximum rotation frequency is set in an appropriate value in accordance with the set torque value. From the standpoint of the user, if the set torque value is set in a desired value, the maximum rotation frequency is automatically set in an appropriate value corresponding to the set torque value. Thus, the electric power tool 10 can be provided which includes an electronic clutch control function of higher value.

In the electric power tool 10 of the present embodiment, in order to notify the controller 31 of the set operation mode, the two mode changeover switches 37 and 38 are provided which respectively output a binary signal of ON or OFF. In conjunction with the slide manipulation of the mode changeover lever 19 by the user, an ON or OFF state of each of the switches 37 and 38 is switched. A digital signal corresponding to the ON or OFF state is outputted to the controller 31. Thus, the controller 31 can easily and reliably determine which operation mode is currently set, and which control method to use to control the motor 30.

Digital signals corresponding to four operation modes are generated and outputted by combining the two mode changeover switches 37 and 38 configured as contact switches. Specifically, by means of a less number of contact switches than the number of operation modes, a different digital signal per operation mode is generated. As such, output of desired digital signals by a minimal number of contact switches also contributes to reduction in size of the electric power tool 10.

Further, in the electric power tool 10 of the present embodiment, both the mode changeover switches 37 and 38 are configured to be turned OFF (i.e., contact points in each of the switches 37 and 38 are separated) at the impact mode at which hammering operation occurs in the rotation direction. In the vibration drill mode at which hammering operation occurs in the axial direction, the mode changeover first switch 37 is configured to be turned OFF. Specifically, at the operation mode at which hammering operation occurs, at least one of the mode changeover switches 37 and 38 is configured to be turned OFF to separate the contact points.

As above, in the case of the operation mode at which hammering operation occurs, the contact points of at least one of the mode changeover switches 37 and 38 are separated. Thereby, wear of the contact points can be inhibited. Reliability of the electric power tool 10 is enhanced.

Especially, at the impact mode, hammering operation in the rotation direction occurs. Thus, a larger impact may be applied to the electric power tool 10 than an impact applied at the vibration drill mode. Thus, if either one of the mode changeover switches 37 and 38 is configured to be turned ON at the impact mode, wear of the contact points of the turned ON switch may be greatly accelerated.

In contrast, the electric power tool 10 of the present embodiment is configured such that both the mode changeover switches 37 and 38 are turned OFF at the impact mode, as noted above. Thus, acceleration of wear of the contact points in both the mode changeover switches 37 and 38 due to hammering produced at the impact mode can be reliably inhibited.

In the electric power tool 10 of the present embodiment, both the maximum rotation frequency at the impact mode and the set torque value at the clutch mode, can be changed by the single pair of setting changeover switches 23 and 24. Also, the control parameter at each mode can be displayed on the single display LED 22.

As such, since the control parameters are displayed on the same single display LED 22 regardless of the operation mode, and the control parameters can be changed by the same pair of setting changeover switches 23 and 24, these components can be efficiently arranged. Thus, while the electric power tool exhibits high performance, the tool can be simplified and reduced in size and cost in its configuration.

Moreover, the control parameters are displayed at different display methods per type of operation mode. Thus, while the same single display LED 22 is shared, the user can easily and reliably identify each of the control parameters.

In the present embodiment, the sleeve 17 is an example of a tool output shaft of the present invention. The trigger switch 18 is an example of a manipulation input receiving unit of the present invention. The mode changeover lever 19 is an example of a manipulation unit of the present invention. The drive force transmission unit 45 is an example of a rotation drive force transmitting unit of the present invention. The controller 31 is an example a motor control unit of the present invention. The mode changeover switches 37 and 38 are examples of switches (contact switches) of the present invention. The shunt resistance 35 is an example of a torque detection unit of the present invention. The setting changeover switches 23 and 24 are examples of a torque value changing unit and a maximum rotation speed changing unit of the present invention. The drill mechanism 55 is an example of a basic transmission mechanism of the present invention. The impact driver mechanism 56 is an example of a first rotation hammering mechanism of the present invention. The vibration drill mechanism 57 is an example of a second rotation hammering mechanism of the present invention.

In the control method of the motor 30, the single speed control is an example of a basic control of the present invention. The impact control is an example of an applied control of the present invention.

[Variations]

The embodiment of the present invention has been described in the above. The embodiment of the present invention is not limited to the above embodiment, and can take various modes within the technical scope of the present invention.

For example, in the above embodiment, the two mode changeover switches 37 and 38 are provided for outputting a digital signal corresponding to the set operation mode to the controller 31. The number of switches is not specifically limited. Various configurations can be employed, e.g., an individual mode changeover switch may be provided per the operation mode, and only one of the mode changeover switches corresponding to the set operation mode may be turned on. However, in the above embodiment, a digital signal per operation mode can be generated by the less number of mode changeover switches (two in the above embodiment) than the number of the operation modes (four in the above embodiment). Thus, for the purpose of reduction in size and cost of the tool, it is preferable to use the minimum number of mode changeover switches as in the case of the above embodiment.

The digital signal indicating the set operation mode does not necessarily take a different value per operation mode (four types of 00, 01, 10 and 11, in the above embodiment). If the control methods of the motor 30 by the controller 31 are the same even at different operation modes, the same digital signal may be outputted at the different operation modes.

In the case of the above embodiment, while the number of types of operation modes is four, the number of types of control methods of the motor 30 by the controller 31 is three. The same single speed control is used at the drill mode and the vibration drill mode. Thus, the controller 31 does not necessarily acknowledge at which operation mode is currently set. The controller 31 only needs to know by which control method the motor 30 should be controlled. Specifically, a different digital signal per control method may be inputted to the controller 31. The number of mode changeover switches can be a minimum necessary number for outputting digital signals which corresponds to the number of control methods.

Thus, in the case of an electric power tool in which two types of control methods are set, for example, the controller only has to know which of the two types of control methods to use to control a motor, even if three types of operation modes are provided. In that case, only one mode changeover switch is sufficient.

In the above embodiment, the two mode changeover switches 37 and 38 configured as microswitches are used to output a digital signal as an electric signal indicating the set operation mode. This is only an example. As far as which set position the mode changeover lever 19 is set (i.e., which control method is used to control the motor 30) can be determined, what electric signal is particularly generated and outputted can be arbitrarily determined.

Figure 12:
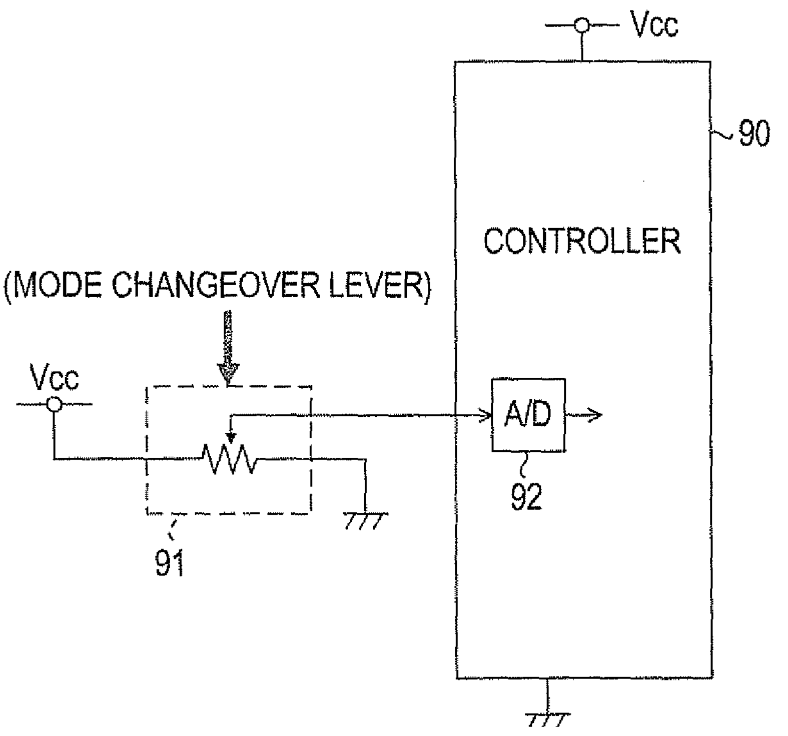
FIG. 12 is an explanatory view showing a configuration example for outputting analog signal as electric signal corresponding to a set position of the mode changeover lever.

For example, as shown in FIG. 12, depending on the set position of the mode changeover lever 19, an analog signal different in voltage value may be outputted. In a configuration shown in FIG. 12, a variable resistance 91 is used to input to a controller 90 an analog signal corresponding to the set position. To both ends of a resistance element in the variable resistance 91, the control voltage Vcc is applied. A voltage dividing value of the control voltage Vcc varies in accordance with the slide manipulation of the mode changeover lever 19.

The voltage dividing value is inputted to an AID converter 92 inside the controller 90 as an analog signal corresponding to the set position of the mode changeover lever 19 (i.e., corresponding to the operation mode). The inputted analog signal is converted to a digital signal by the AID converter 92.

Other than the configuration in which an analog signal can be outputted by the variable resistance 91, as shown in FIG. 12, various sensors (e.g., force sensor, strain sensor, magnetic sensor (Hall sensor), infrared sensor, optical sensor including a photo diode and a photo coupler, capacitive sensor, etc.) may be provided, for example. These sensors may be configured such that their detection values may vary in accordance with the set position of the mode changeover lever 19. Based on the detection signals from the sensors, the operation mode may be determined. The detection signals may be transmitted to the controller 31 via wireless communication.

Also, for example, in accordance with the set operation mode, an AC analog signal, in which a combination of at least one or both of an amplitude and a frequency is different, may be generated to be outputted to the controller.

In the above embodiment, there are nine levels of set torque values changeable by the user at the clutch mode. This is merely an example. How many levels to set can be arbitrarily determined. For example, the levels can be set to fifteen levels. In that case, the parameter at each level may be set from 1 to 9 and A to F. Thereby, the parameter at each of the fifteen levels can be displayed on the display LED 22.

Figure 13:
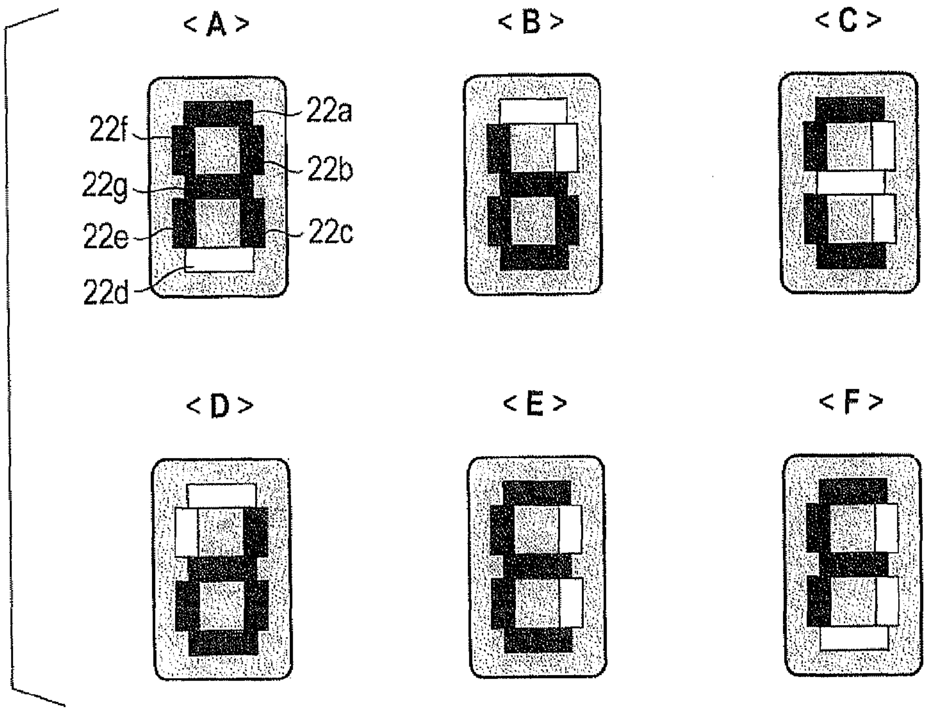
FIG. 13 is an explanatory view showing a display example of alphabets, as a variation of a display method by the display LED.

FIG. 13 shows an example of display of alphabets A to F by the display LED 22. As shown in FIG. 13, "A", for example, may be displayed by all the six LEDs other than the fourth LED **22*d*, among the seven LEDs 22*a* to 22*g***. The alphabets "b" and "d" are displayed as lower-case alphabets.

Also, in the above embodiment, one type of clutch mode is provided. However, various types of clutch modes may be set as required, such as a plurality of types of clutch modes different in number (number of level) of changeable set torque values, a plurality of types of clutch modes different in torque interval which is an interval between a plurality of changeable set torque values, a plurality of types of clutch modes different in maximum rotation frequency set in accordance with each set torque value, and so on.

To set the maximum rotation frequency individually in accordance with each set torque value is only an example, and is not necessarily essential. For example, the maximum rotation frequency may be constant regardless of the set torque value. Also, for example, the same maximum rotation frequency may be set to a plurality of set torque values. Particularly, torques 1 to 3 may be set as low, torques 4 to 6 may be set as middle, and torque 7 to 9 may be set as high.

In the above embodiment, only one type of the impact mode is provided. However, various types of impact modes may be set as required, such as a plurality of types of impact modes different in number (number of level) of changeable maximum rotation frequency, a plurality of types of impact modes different in rotation frequency interval (speed interval) which is an interval between a plurality of changeable maximum rotation frequencies, and so on.

It is also an example to set the changeable maximum rotation frequency to three levels at the impact mode.

Also in the above embodiment, the control method is based on a method in which the rotation frequency (rotation speed) continuously increases in proportion to the pulled amount of the trigger switch 18. However, the control method is not limited to the above method but may be based on a method in which, for example, the rotation frequency increases in a stepwise fashion, in accordance with the pulled amount of the trigger switch 18. Also, for example, the rotation frequency may increase in an increasing manner different from the proportional manner (e.g., in a quadric manner). How to control to increase the rotation frequency in accordance with the pulled amount of the trigger switch 18 can be arbitrarily determined. The control method can be based on a simple control in which the rotation frequency is controlled to a certain rotation frequency, regardless of the pulled amount, if the trigger switch 18 is pulled only a little.

In the above embodiment, it is explained that, in any of the three types of control methods (single speed control, electronic clutch control and impact control), so-called feedback control is basically performed. In the feedback control, the actual rotation frequency of the motor 30 is detected, and the control is performed such that the detected result coincides with the set rotation frequency defined in accordance with the pulled amount of the trigger switch 18. Specifically, it is explained that all the motor control methods are based on feedback control, and further, control by the above-described unique method is performed in each of the motor control methods.

However, implementation of feedback control in all the motor control methods as such is merely an example. For example, feedback control may be used only in the electronic clutch control, and open control may be used in the other controls. Whether or not to use feedback control, or at which motor control method to use feedback control if used, can be arbitrarily determined.

In the above embodiment, upon detecting the rotation torque of the sleeve 17, the rotation torque is not directly detected but indirectly detected by detecting the output torque of the motor 30 based on the motor current detected by the shunt resistance 35. However, such detection method is merely an example. As long as the rotation torque of the sleeve 17 (rotation torque of the tool bit) can be detected, whether to detect the rotation torque directly or indirectly, or what particular manner to use for detection, can be arbitrarily determined.

In the above embodiment, the same drill mechanism is used at both the clutch mode and the drill mode, regarding the transmission mechanism. The same single speed control is used at both the drill mode and the vibration drill mode, regarding the control method of the motor 30 by the controller 31. There is no problem in that there are cases in which the same transmission mechanism is used at different operation modes, or in which the same control method by the controller 31 is used at different operation modes, as above.

Specifically, as long as the operation at a desired operation mode can be achieved, what particular mechanism to provide as controller control, and which transmission mechanism to be combined with which controller control, can be arbitrarily determined.

It is rather preferable to reduce the types of the transmission mechanisms and the control methods as much as possible to share the same transmission mechanism or the same control method at a plurality of different operation modes, and to achieve different operation modes by devising a combination of the transmission mechanism and the control method, in order for reduction in size and cost of the tool.

It is merely an example to provide four operation modes in one electric power tool 10, as is the case in the above embodiment. How many operation modes to set in one electric power tool, how to set the operation modes, or what transmission mechanism and what control method to particularly combine in order to implement each of the operation modes, can be arbitrarily determined.

Particular examples of the operation modes other than the above-described four operation modes are a self-drilling screw mode, an electronic pulse mode, etc. The self-drilling screw mode is a mode at which a self-drilling screw is fastened at high speed while a hole is being formed. When seating of the screw is detected, the screw is controlled to slow down (reduce) the rotation speed or stop. In the electronic pulse mode, a tool bit is operated while the rotation frequency is being changed into a triangular pulse form (triangular waveform), thereby to perform fastening of a screw, etc.

The controller 31 which controls the motor 30 is explained to be configured by a microcomputer mainly including a CPU 40 in the above embodiment. Such configuration of the controller 31 is only an example. Specifically, the controller 31 may be configured by a programmable logic device such as an ASIC (Application Specific Integrated Circuit), a FPGA (Field Programmable Gate Array), etc., or by a discrete circuit. As long as the motor 30 can be controlled by a desired control method corresponding to the operation mode, there is no specific limitation how to particularly configure the controller 31.

The program of the above-described main control process executed by the controller 31 may be stored on a recording medium in all forms which can be read by the CPU for use. The recording medium includes, for example, a portable semiconductor memory (e.g., a USB memory, a memory card (registered trademark), and so on), etc.

In the above embodiment, a seven-segment LED is used as the display LED 22. This is only an example. As long as the control parameter can be displayed per operation mode, there is no specific limitation on what particular display device is used.

Figure 14A:
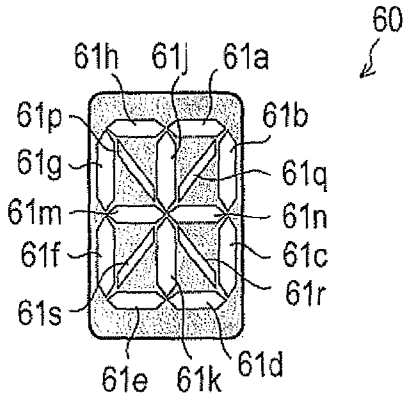
FIG. 14A is an explanatory view showing a configuration example including a sixteen-segment LED, as a variation of the display LED.

Specifically, upon using a display device having a plurality of segments of LEDs, a display device having how many segments to use can be arbitrarily determined. For example, a fourteen-segment LED may be used, or, for example, as shown in FIG. 14A, a display LED 60 including a sixteen-segment LED may be used. The display LED 60, as shown in FIG. 14B, is a known device including a total of sixteen LEDs from a first LED 61*a* to a sixteenth LED 61*s*.

There are various display methods of control parameters which use the display LED 60 formed by the sixteen-segment LED. Numerical display, alphabetic display from A to F, and horizontal bar display of three levels as in the above embodiment can be of course performed. There are also other various display methods.

Figure 14B:
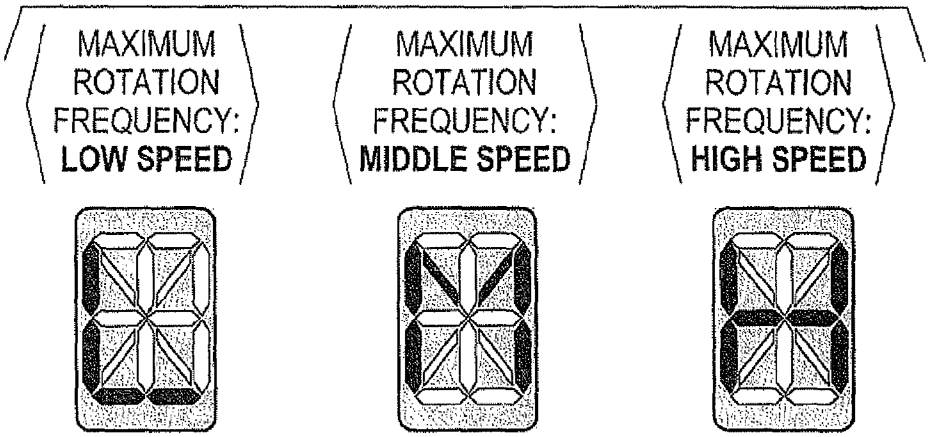
FIGS. 14B and 14C are explanatory views showing display examples of the maximum rotation frequency setting by the display LED shown in FIG. 14A.

For example, as shown in FIG. 14B, the parameter of the maximum rotation frequency at the impact mode may be displayed as "L" at low speed, "M" at middle speed, and "H" at high speed. For example, display of "L" at low speed can be implemented by turning on the four LEDs from the fourth LED 61*d* to the seventh LED 61*g*.

Figure 14C:
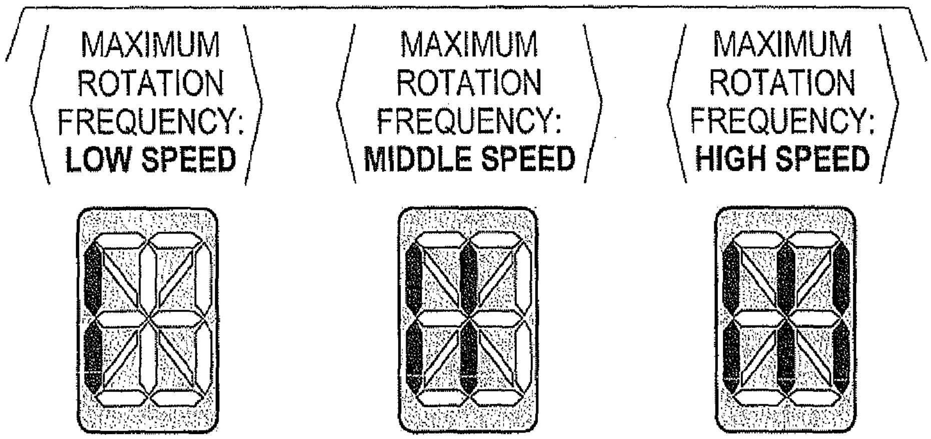

Also, for example, as shown in FIG. 14C, the parameter of the maximum rotation frequency at the impact mode may be displayed by vertical bars of three levels. Specifically, when the maximum rotation frequency is set at low speed, the sixth LED 61*f* and the seventh LED 61*g* are turned on to display one vertical bar. When the maximum rotation frequency is set at middle speed, the sixth LED 61*f*, the seventh LED 61*g*, the ninth LED 61*j* and the tenth LED 61*k* are turned on, thereby to display two vertical bars. When the maximum rotation frequency is set at high speed, the first LED 61*a* and the second LED 61*b*, in addition to the four LEDs turned on at middle speed, are further turned on, thereby to display three vertical bars.

The above embodiment illustrates use of one display LED 22. A plurality of the display LEDs 22 may be used and shared by the respective control parameters. Use of a plurality of display LEDs allows display of, for example, two-figure numbers, and expansion of a displayable range. In this case, however, it is not always necessary to use all the plurality of display LEDs to display all the changeable control parameters.

For example, in a case of having two display LEDs, one control parameter may be displayed by the two display LEDs, and another may be displayed by using only one of the display LEDs. Specifically, it is preferable that at least one of the plurality of LEDs is shared for all the control parameters.

The same applies to the setting changeover switches 23 and 24. For example, one control parameter may be configured to be changeable by the two setting changeover switches 23 and 24, and another may be configured to be changeable only by one of the two setting changeover switches 23 and 24.

Use of the display LED 22 including a plurality of segments as a display device to display the control parameters is merely an example. Various types of display devices such as a liquid crystal display and an organic EL display may be used.

Upon using a display device such as a liquid crystal display, the liquid crystal display may be provided, for example, with a touch panel function. Shapes of the setting changeover switches 23 and 24 may be displayed on the liquid crystal display. By touching the portion displaying the switches 23 and 24, the user may be able to change the control parameter.

In the above embodiment, the two setting changeover switches 23 and 24 are provided for the user to change the control parameters at the impact mode and the clutch mode. The configuration including the two setting changeover switches 23 and 24 is merely an example.

Figure 15A:
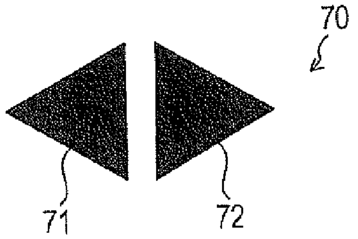
FIGS. 15A, 15B, 15C and 15D are explanatory views showing variations of a setting changeover switch constituting the manipulation/display panel.

For example, a setting changeover section 70 may be configured which includes a setting changeover down switch 71 and a setting changeover up switch 72 in the form as shown in FIG. 15A.

Figure 15B:
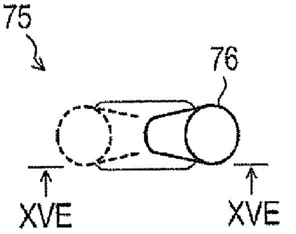
Figure 15E:
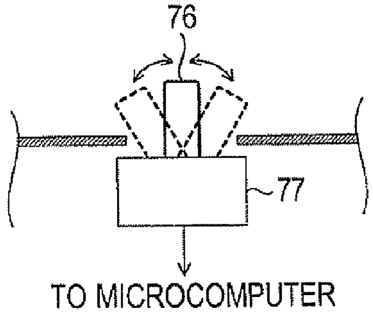
FIGS. 15E, 15F and 15G are cross sectional views taken along lines XVE-XVE, XVF-XVF and XVG-XVG in FIGS. 15B, 15C and 15D, respectively.

Also, for example, a setting changeover section 75 may be configured which includes a manipulation lever 76 and a manipulation output circuit 77, as shown in FIGS. 15B and 15E. In this configuration, the manipulation lever 76 normally stands in a vertical direction, and can be brought down in a right and left direction as shown in the figures by user manipulation (load). In which direction of right and left the manipulation lever 76 is brought down is detected by the manipulation output circuit 77. A signal indicating a result of the detection is outputted from the manipulation output circuit 77. Thus, the control parameter may be set to decrease when the manipulation lever 76 is brought down on the left side, and to increase when the manipulation lever 76 is brought down on the right side, for example.

Figure 15C:
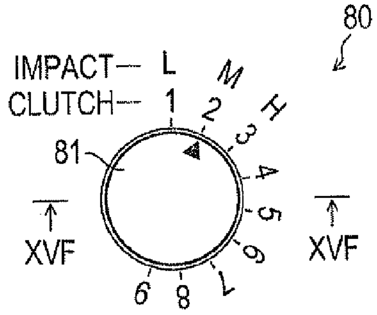
Figure 15F:
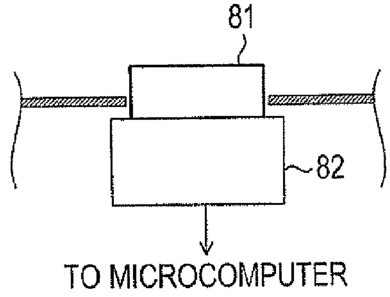
Figure 15D:
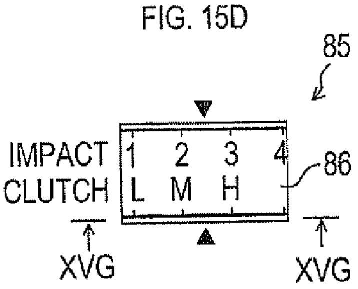
Figure 15G:
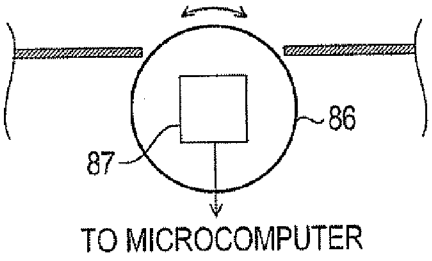

Also, for example, a setting changeover section 80 may be configured which includes a manipulation dial 81 and a manipulation output circuit 82, as shown in FIGS. 15C and 15F, or a setting changeover section 85 which includes a manipulation dial 86 and a manipulation output circuit 87, as shown in FIGS. 15D and 15G. In these configurations, each of the manipulation dials 81 and 86 is rotatable on its axis center. A signal in accordance with its rotation position is outputted to the manipulation output circuit 82, 87. Thus, as shown in the figures, by associating each control parameter with each of a plurality of different rotation positions in the manipulation dial 81, 86 per operation mode, a desired control parameter can be set.

The present invention may be applied not only to a battery-powered electric power tool like the above-described electric power tool 10, but also to an electric power tool which receives power supply via a cord, or which is configured to rotate and drive a tool element by an AC motor.

The motor 30 may be configured as a two-phase brushless DC motor, or as a brushless DC motor having four phases or above.

Each of the switching elements Q1 to Q6 constituting the motor drive circuit 33 may be a switching element other than MOSFET (e.g., bipolar transistor, and others).

The tool bit may be undetachably attached to the sleeve 17.

What is claimed is:

1. An electric power tool provided with a plurality of operation modes, the tool comprising:

a motor configured to drive a tool output shaft, the tool output shaft being configured to receive a tool element, a manipulation input receiving unit configured to receive, from a user, a manipulation input used to indicate a manipulation variable for operating the motor, a mode changeover unit comprising a manipulation portion by which, through operation of a single switch, the user can select one of the plurality of operation modes, and that causes the electric power tool to switch to operate in an operation mode selected by the user, the selected operation mode corresponding to (i) a selected control parameter of a plurality of control parameters for operating the motor and (ii) a corresponding selected transmission mechanism of a plurality of transmission mechanisms;

a rotation drive force transmitting unit that transmits a rotation drive force of the motor to the tool output shaft and includes a plurality of types of transmission mechanisms that differ in transmission methods, the rotation drive force transmitting unit being configured to switch to the selected one of the transmission mechanisms of the plurality of transmission mechanisms corresponding to the selected operation mode in conjunction with manipulation of the manipulation portion, thereby to transmit the rotation drive force of the motor to the tool output shaft via the selected one of the transmission mechanisms;

an electric signal output unit that outputs an electric signal corresponding to the selected operation mode;

a setting change manipulation unit configured to receive user input selecting a selected control value for the selected control parameter, wherein the setting change manipulation unit is configured to enable selection of different control values depending on the selected operation mode; and a motor control unit that sets a control method of the motor to a selected control method of a plurality of different types of control methods, based on the electric signal, wherein the motor control unit controls the motor by the selected control method, based on the manipulation input, the selected control parameter, and the selected control value.

2. The electric power tool according to claim 1, wherein the plurality of different types of control methods comprise:

at least a first basic control in which the motor is rotated at a rotation speed corresponding to manipulation variable of the manipulation input within a range up to a first preset maximum rotation frequency, and at least one applied control that differs from the first basic control.

3. The electric power tool according to claim 2, further comprising a torque detection unit that detects a rotation torque of the tool output shaft, wherein the selected control parameter is the rotation torque;

wherein the applied control comprises an electronic clutch control, and wherein the applied control stops rotation of the motor when the rotation torque detected by the torque detection unit reaches or exceeds a selected set torque value.

4. The electric power tool according to claim 3, wherein the setting change manipulation unit comprises a torque value setting changing unit, the torque value setting changing unit being configured to change the selected set torque value to one of a plurality of selectable torque values by user operation, wherein the selected set torque value is the selected control value;

wherein, when the selected control method is the electronic clutch control, the motor control unit performs the electronic clutch control based on the selected set torque value.

5. The electric power tool according to claim 4, wherein the setting change manipulation unit is further configured to set a maximum rotation frequency per a plurality of the set torque values, and, wherein, when the selected control method is the electronic clutch control, the motor control unit, when the control method is set in the electronic clutch control, performs the electronic clutch control based on the selected set torque value and the maximum rotation speed.

6. The electric power tool according to claim 5, wherein the torque value setting changing unit is further configured to set the plurality of selectable torque values in a stepwise fashion.

7. The electric power tool according to claim 6, wherein the torque value setting changing unit is further configured to set the plurality of set torque values to increase in a stepwise fashion by a predetermined set torque interval, from a minimum value to a maximum value, and, wherein the applied control further comprises an additional electronic clutch control; and wherein the selected set torque value of the electronic clutch control differs from the selected set torque value of the additional electronic clutch control by the set torque interval.

8. The electric power tool according to claim 3, further comprising wherein the selected one of the transmission mechanisms comprises a basic transmission mechanism, configured to transmit rotation of the motor to the tool output shaft, wherein the selected operation mode comprises a clutch mode configured to stop rotation of the motor, when the tool output shaft is rotated and the rotation torque of the tool output shaft reaches or exceeds the selected set torque value.

9. The electric power tool according to claim 2, wherein the plurality of different types of control methods further comprises a second basic control in which the motor is rotated at a rotation speed corresponding to a manipulation variable of the manipulation input within a range up to a second preset maximum rotation frequency, wherein the first preset maximum rotation frequency differs from the second preset maximum rotation frequency, wherein the selected control value comprises a maximum rotation speed;

wherein the setting change manipulation unit further comprises a maximum rotation speed setting changing unit configured to receive user input selecting a selected basic control of the first basic control and the second basic control and the maximum rotation speed setting changing unit further configured to receive user input selecting a selected maximum rotation speed; and wherein the motor control unit performs the selected basic control based on the selected maximum rotation speed.

10. The electric power tool according to claim 1, wherein the setting change manipulation unit is further configured to receive user input selecting a selected control value for the control parameter in a stepwise fashion.

11. The electric power tool according to claim 10, wherein the plurality of different types of control methods further comprises a first basic control in which the motor is rotated at a rotation speed corresponding to a manipulation variable of the manipulation input within a range up to a first selected maximum rotation speed of a first plurality of maximum rotation speeds;

wherein the first plurality of maximum rotation speeds are set to increase in a stepwise fashion by a first predetermined speed width, from a first minimum value to a first maximum value, wherein the plurality of different types of control methods further comprises a second basic control in which the motor is rotated at a rotation speed corresponding to the manipulation variable of the manipulation input within a range up to a second selected maximum rotation speed of a second plurality of maximum rotation speeds;

wherein the second plurality of maximum rotation speeds are set to increase in a stepwise fashion by a second predetermined speed width, from a second minimum value to a second maximum value; and wherein the first predetermined speed width differs from the second predetermined speed width.

12. The electric power tool according to claim 2, further comprising wherein the selected one of the transmission mechanisms comprises a first rotation hammering mechanism, configured to transmit rotation of the motor to the tool output shaft and to use the rotation drive force of the motor to apply intermittent hammering to the tool output shaft in the tool output shaft rotation direction, wherein the selected operation mode comprises an impact mode configured to transmit the rotation drive force of the motor to the tool output shaft via the first rotation hammering mechanism.

13. The electric power tool according to claim 1, wherein the plurality of transmission mechanisms further comprises:

at least one of:

a basic transmission mechanism that transmits rotation of the motor to the tool output shaft;

a first rotation hammering mechanism that transmits rotation of the motor to the tool output shaft and is configured to use the rotation drive force of the motor to apply intermittent hammering to the tool output shaft in the tool output shaft rotation direction; and a second rotation hammering mechanism that transmits rotation of the motor to the tool output shaft and is configured to use the rotation drive force of the motor to apply intermittent hammering to the tool output shaft in the tool output shaft axial direction.

14. The electric power tool according to claim 1, wherein the electric signal output unit is configured to output an analog signal of a value corresponding to the selected set position of the manipulation portion as the electric signal.

15. The electric power tool according to claim 1, wherein the electric signal output unit is configured to output a digital signal corresponding to the selected set position of the manipulation portion as the electric signal.

16. The electric power tool according to claim 15, wherein the electric signal output unit includes at least one switching portion that outputs a binary signal indicating either one of an ON or OFF state, and wherein when the manipulation portion is displaced by the user to one of the set positions, the ON or OFF state of the at least one switching portion is switched to a state corresponding to the selected set position.

17. The electric power tool according to claim 16, wherein the electric signal output unit comprises a plurality of switching portions fewer in number than a number of the plurality of operation modes, and, by combination of the ON or OFF state of each of the plurality of switching portions, a digital signal is outputted that differs per the selected set position.

18. The electric power tool according to claim 16, wherein the at least one switching portion comprises a plurality of contact points that are engaged by a contact switch in which the contact points contact the contact switch in one of the ON and OFF states and the contact points are separated from the contact switch in the other of the ON and OFF states, wherein the plurality of transmission mechanisms comprise a hammering mechanism configured to use the rotation drive force of the motor to apply intermittent hammering to the tool output shaft in the tool output shaft rotation direction or the tool output shaft axial direction, and wherein a portion of the plurality of contact points are separated from the contact switch when the selected one of the transmission mechanisms is to the hammering mechanism.

19. The electric power tool according to claim 16, wherein the at least one switching portion comprises a plurality contact points that are engaged by a contact switch to contact the contact switch in one of the ON and OFF states and to be separated from the contact switch in the other of the ON and OFF states;

wherein the plurality of transmission mechanisms comprise a hammering mechanism configured to use the rotation drive force of the motor to apply intermittent hammering to the tool output shaft in the tool output shaft rotation direction; and wherein all of the plurality of contact points are separated from the contact switch when the selected one of the transmission mechanisms is the hammering mechanism.

20. An electric power tool configured with a plurality of operation modes, the plurality of operation modes comprising a drill mode, in which a tool output shaft to which a tool element is attached is rotated, a clutch mode, in which the tool output shaft is rotated and rotation of the tool output shaft is stopped when a rotation torque of the tool output shaft reaches or exceeds a predetermined set torque value, an impact mode, in which the tool output shaft is rotated and intermittent hammering can be applied to the tool output shaft in the tool output shaft rotation direction, and a vibration drill mode, in which the tool output shaft is rotated and intermittent hammering can be applied to the tool output shaft in the tool output shaft axial direction, the electric power tool comprising:

a motor configured to rotate the tool output shaft and to reciprocate the output shaft to cause the intermittent hammering;

a mode changeover unit that sets the operation mode to a selected operation mode of the plurality of operation modes;

the selected operation mode further corresponding to a selected control parameter of a plurality of control parameters;

a torque detection unit that detects a rotation torque of the tool output shaft; and a motor control unit that controls the motor to operate in accordance with the selected operation mode and the selected control parameter, wherein, when the selected operation mode is the clutch mode, the motor control unit is configured to stop rotation of the motor when the rotation torque detected by the torque detection unit reaches or exceeds the predetermined set torque value, and when the selected operation mode is in a different operation mode from the clutch mode, the motor control unit uses a different selected control parameter than the predetermined set torque value.

21. The electric power tool according to claim 20, wherein at least two of the plurality of operation modes comprise specified operation modes in which the motor control unit uses a predetermined control parameter corresponding to the selected operation mode to control the motor, and the control parameter can be changed to one of a plurality of different values by user operation, wherein the electric power tool further comprises:

a setting change manipulation unit that is configured to receive user input by being manipulated by a user and to change the control parameter based on received user input, the selected control parameter being shared at the specified operation modes and corresponding to the specified operation modes; and a parameter control unit that, when the selected operation mode is one of the specified operation modes, accepts by the setting change manipulation unit, changes to the control parameter corresponding to the selected specified operation mode.

22. The electric power tool according to claim 21, further comprising a display unit that is shared in the specified operation modes and displays parameter information indicating the control parameter corresponding to each of the specified operation modes, wherein the parameter control unit, when the selected operation mode is one of the specified operation modes, accepts, by the setting change manipulation unit, changes to the control parameter corresponding to the selected specified operation mode, and displays the parameter information indicating the currently set control parameter on the display unit.

23. The electric power tool according to claim 22, wherein the parameter control unit displays the parameter information on the display unit by display methods that differ per operation mode.

24. The electric power tool according to claim 23, wherein at least one of the display methods that differ per operation mode is an indication by numerals.

25. The electric power tool according to claim 23, wherein at least one of the display methods that differ per operation mode is an indication other than by numerals.

26. The electric power tool according to claim 25, wherein at least one of the display methods other than by numerals is an indication by one of alphabets, horizontal bars, and vertical bars.

27. The electric power tool according to claim 22, wherein the display unit includes a display device comprising a plurality of segments.

28. The electric power tool according to claim 27, wherein the display device is a seven-segment LED.

29. The electric power tool according to claim 21, wherein the setting change manipulation unit at least includes an increase manipulation portion that is depressed for increasing the control parameter, and a decrease manipulation portion that is depressed for decreasing the control parameter.

30. The electric power tool according to claim 29, wherein the parameter control unit increases the control parameter by one level each time the increase manipulation portion is depressed, and increases the control parameter in a stepwise fashion at a predetermined interval as long as the increase manipulation portion is kept depressed for more than a predetermined period, and the parameter control unit decreases the control parameter by one level each time the decrease manipulation portion is depressed, and decreases the control parameter in a stepwise fashion at a predetermined interval as long as the decrease manipulation portion is kept depressed for more than a predetermined period.

31. An electric power tool provided with a plurality of operation modes, the tool comprising:

a motor, a tool output shaft that is configured to be driven by the motor, a plurality of transmission mechanisms that transmit a rotational drive force of the motor to the tool output shaft, a manipulation portion that is operated by a user to activate the motor and indicate an intensity level at which the motor should be activated to, and a mode changeover unit configured such that manipulation of a single switch results in a selection of an operation mode among the plurality of operation modes, each of the operation modes corresponding to a unique combination of (i) a transmission mechanism among the plurality of transmission mechanisms, and (ii) a corresponding control parameter for operation of the electric motor, selected among a plurality of control parameters.

32. The electric power tool according to claim 31, wherein the plurality of control parameters includes at least a rotation frequency and a torque value of the motor.

33. The electric power tool according to claim 31, further comprising a display unit that displays a current value of the control parameter.

34. The electric power tool according to claim 1, wherein at least a first operating mode of the plurality of operating modes has a corresponding first control parameter that is not used in at least a second operating mode of the plurality of operating modes.

35. The electric power tool according to claim 34, wherein the motor control unit controls the motor such that when operating the motor in the second operating mode, the first control parameter is not used.

36. The electric power tool according to claim 31, wherein at least a first operating mode of the plurality of operating modes has a corresponding first control parameter that is not used in at least a second operating mode of the plurality of operating modes.

37. The electric power tool according to claim 36, wherein motor control unit controls the motor such that when operating the motor in the second operating mode, the first control parameter is not used.

38. An electric power tool provided with a plurality of operation modes, the tool comprising:

an electric motor configured to drive a tool output shaft;

a manipulation input receiving unit configured to receive user input corresponding to a desired intensity level for operating the electric motor, and configured to output an electric signal proportional to the desired intensity level;

a mode changeover unit configured to receive input from a user, such that operation of a single switch selects an operation mode from among the plurality of operation modes, each of the operation modes including a unique combination of (i) a control method, among a plurality of control methods, for operating the electric motor by a corresponding control parameter, and (ii) a transmission method among a plurality of transmission methods;

a rotation drive force transmitting unit configured to transmit a rotation drive force of the electric motor to the tool output shaft, and configured with a plurality of types of transmission mechanisms for each of the plurality of transmission methods, the rotation drive force transmitting unit being configured to switch to a selected one or more of the transmission mechanisms based on the selected operation mode;

a setting change manipulation unit configured to receive user input to select a control value for a control parameter corresponding to the selected operation mode, wherein the setting change manipulation unit is configured to enable selection of different control values for corresponding control parameters depending on the selected operation mode; and a motor control unit that operates the electric motor according to a control method corresponding to the selected operation mode, and based on the corresponding selected control value for the corresponding control parameter, and the electric signal.

* * * * *